(12) United States Patent
Yu et al.

(10) Patent No.: US 11,838,218 B2
(45) Date of Patent: Dec. 5, 2023

(54) DATA PACKET TRANSMISSION METHOD AND COMMUNICATIONS APPARATUS

(71) Applicant: HUAWEI TECHNOLOGIES CO., LTD., Guangdong (CN)

(72) Inventors: Feng Yu, Beijing (CN); Bo Lin, Shenzhen (CN); Zhenzhen Cao, Boulogne Billancourt (FR)

(73) Assignee: Huawei Technologies Co., Ltd., Shenzhen (CN)

(*) Notice: Subject to any disclaimer, the term of this patent is extended or adjusted under 35 U.S.C. 154(b) by 32 days.

(21) Appl. No.: 17/561,130

(22) Filed: Dec. 23, 2021

(65) Prior Publication Data

US 2022/0116332 A1    Apr. 14, 2022

Related U.S. Application Data

(63) Continuation of application No. PCT/CN2020/097564, filed on Jun. 23, 2020.

(30) Foreign Application Priority Data

Jun. 27, 2019    (CN) .................... 201910564661.X

(51) Int. Cl.
*H04L 47/32*    (2022.01)
*H04W 28/02*    (2009.01)

(52) U.S. Cl.
CPC ......... *H04L 47/32* (2013.01); *H04W 28/0205* (2013.01)

(58) Field of Classification Search
CPC ... H04L 1/1841; H04L 1/1848; H04L 47/286; H04L 47/29; H04L 47/32; H04L 47/34; H04W 28/0205; H04W 28/04
See application file for complete search history.

(56) References Cited

U.S. PATENT DOCUMENTS

| | | | | |
|---|---|---|---|---|
| 10,212,728 B2* | 2/2019 | Lee | ....................... | H04W 80/02 |
| 2016/0315868 A1* | 10/2016 | Zhang | ................... | H04L 47/624 |
| 2017/0064679 A1 | 3/2017 | Zhang et al. | | |

(Continued)

FOREIGN PATENT DOCUMENTS

| | | |
|---|---|---|
| CN | 101060386 A | 10/2007 |
| CN | 104717043 A | 6/2015 |

(Continued)

OTHER PUBLICATIONS

PCT International Search Report and Written Opinion issued in International Application No. PCT/CN2020/097564 dated Aug. 28, 2020, 17 pages (with English translation).

(Continued)

*Primary Examiner* — Pao Sinkantarakorn

(74) *Attorney, Agent, or Firm* — Fish & Richardson P.C.

(57) ABSTRACT

This application provides example data packet transmission methods and example communications apparatuses. One example method includes receiving a data packet, where the data packet is in an undelivered state. The data packet can then be delivered during running of a reordering timer upon an arrival of a first delay cut-off moment corresponding to the data packet or an arrival of a second delay cut-off moment of an additional data packet before the data packet in a reordering window.

18 Claims, 7 Drawing Sheets

(56) References Cited

U.S. PATENT DOCUMENTS

2018/0098241 A1* 4/2018 Callard ................ H04W 80/06
2019/0044880 A1* 2/2019 Yi ......................... H04L 47/624
2020/0100324 A1* 3/2020 Wittberg ............... H04W 24/02

FOREIGN PATENT DOCUMENTS

| CN | 106658352 A | 5/2017 |
|----|-------------|--------|
| CN | 107592329 A | 1/2018 |
| WO | 2015119410 A1 | 8/2015 |
| WO | 2018171407 A1 | 9/2018 |

OTHER PUBLICATIONS

Extended European Search Report issued in European Application No. 20833124.9 dated Jun. 14, 2022, 9 pages.

* cited by examiner

DATA PACKET TRANSMISSION METHOD AND COMMUNICATIONS APPARATUS

CROSS-REFERENCE TO RELATED APPLICATIONS

This application is a continuation of International Application No. PCT/CN2020/097564, filed on Jun. 23, 2020, which claims priority to Chinese Patent Application No. 201910564661.X, filed on Jun. 27, 2019. The disclosures of the aforementioned applications are herein incorporated by reference in their entireties.

TECHNICAL FIELD

This application relates to the communications field, and more specifically, to a data packet transmission method and a communications apparatus.

BACKGROUND

In a current transmission process of data packets, sequential transmission of the data packets needs to be ensured in a scenario with a high communication indicator requirement. In over-the-air transmission, although data packets are sequentially sent over an air interface at a transmit end, the data packets may be disorderly received at a receive end due to a factor such as wireless channel instability. Currently, among protocol layers of a network device or a terminal, a radio link control (RLC) layer and a Packet Data Convergence Protocol (PDCP) layer are responsible for reordering and delivering received disordered data packets. Specifically, the PDCP layer and the RLC layer may maintain a reordering timer, and reorder and deliver the received disordered data packets by using the reordering timer. However, when the reordering timer is used to reorder and deliver the received disordered data packets, it is very likely that transmission of the data packets cannot meet a delay requirement. Consequently, the transmission of the data packets does not meet a transmission delay requirement of the data packets, and this seriously affects transmission efficiency of the data packets, and therefore affects communication efficiency.

SUMMARY

This application provides a data packet transmission method and a communications apparatus, so that a data packet can be delivered at a delay cut-off moment corresponding to the data packet, and delivery of a data packet is no longer limited by a reordering timer. In this way, a problem of data packet delivery timeout that may be caused by disordered receiving is resolved, thereby meeting a data packet delay requirement and improving data packet transmission efficiency.

According to a first aspect, a data packet transmission method is provided. The method may be executed by a receiving device, or may be executed by a chip configured in the receiving device. The receiving device may be a terminal or a network device. The method includes: receiving a data packet, where the data packet is in an undelivered state; and delivering the data packet during running of a reordering timer upon an arrival of a delay cut-off moment corresponding to the data packet or an arrival of a delay cut-off moment of a data packet before the data packet in a reordering window.

In the data packet transmission method provided in the first aspect, when a data packet is in the undelivered state due to a limitation of the reordering timer during waiting for a disordered data packet to be received, even if the reordering timer is in a running state (not timed out), the data packet can be delivered upon an arrival of a delay cut-off moment corresponding to the data packet or an arrival of a delay cut-off moment of a data packet before the data packet in the reordering window. Delivery of each data packet is no longer limited by the reordering timer. In this way, a problem of data packet delivery timeout that may be caused by the limitation of the reordering timer is resolved, thereby meeting a data packet delay requirement and improving data packet transmission efficiency.

In a possible implementation of the first aspect, the method further includes: stopping the reordering timer, where the reordering timer is triggered to start by the data packet or by the data packet received before the data packet, and the delay cut-off moment corresponding to the data packet or the delay cut-off moment of the data packet before the data packet in the reordering window is earlier than a timeout moment of the reordering timer. In this implementation, stopping or resetting the reordering timer after the data packet is delivered can avoid impact of the reordering timer on delivery of a data packet that is received after the data packet and that is consecutive to the data packet, thereby meeting a delay requirement of the data packet that is received after the data packet and that is consecutive to the data packet.

In a possible implementation of the first aspect, the delay cut-off moment of the data packet before the data packet in the reordering window is a delay cut-off moment corresponding to a first unreceived data packet counted forward from the data packet in the reordering window.

In a possible implementation of the first aspect, the delay cut-off moment of the data packet before the data packet in the reordering window is a delay cut-off moment corresponding to a data packet with an earliest delay cut-off moment in a data packet that is before the data packet in the reordering window and whose delay cut-off moment does not time out.

In a possible implementation of the first aspect, the method further includes delivering a data packet that has been stored in the reordering window and that is before the data packet, and delivering a data packet that has been stored in the reordering window, that is after the data packet, and that has a sequence number consecutive to that of the data packet.

In a possible implementation of the first aspect, the data packet carries a sending moment of the data packet, and the method further includes: determining the delay cut-off moment corresponding to the data packet based on the sending moment of the data packet and a transmission delay budget.

In a possible implementation of the first aspect, the method further includes: determining the delay cut-off moment corresponding to the data packet based on a delay cut-off moment corresponding to a $1^{st}$ data packet and a data packet period, where the sequence number of the data packet is greater than or equal to 1.

In a possible implementation of the first aspect, the method further includes: using 1 plus a maximum sequence number of a delivered data packet as a value of a lower boundary of the reordering window, or using 1 plus a sequence number of a data packet whose delay cut-off moment arrives as the value of the lower boundary of the reordering window.

In a possible implementation of the first aspect, the delay cut-off moment corresponding to the data packet is a timeout moment of a maximum delay timer corresponding to the data packet, or the delay cut-off moment corresponding to the data packet is a cut-off moment of a duration corresponding to the data packet, and the delivering the data packet upon an arrival of a delay cut-off moment corresponding to the data packet includes:

delivering the data packet at the timeout moment of the maximum delay timer, or delivering the data packet at the cut-off moment of the duration.

According to a second aspect, a communications apparatus is provided, including: a unit or a means configured to perform each step in the first aspect or any possible implementation of the first aspect, or a unit or a means configured to perform each step in the fourth aspect or any possible implementation of the fourth aspect.

According to a third aspect, a communications apparatus is provided, including at least one processor, configured to connect to a memory, to invoke a program in the memory to perform the method provided in the first aspect or any possible implementation of the first aspect. The memory may be located in the apparatus or may be located outside the apparatus. In addition, there are one or more processors.

According to a fourth aspect, this application provides a communications apparatus, including at least one processor and an interface circuit, and the at least one processor is configured to perform the method provided the first aspect or any possible implementation of the first aspect.

According to a fifth aspect, a network device is provided. The network device includes the apparatus provided in the second aspect, or the network device includes the apparatus provided in the third aspect, or the network device includes the apparatus provided in the fourth aspect.

According to a sixth aspect, a terminal is provided. The terminal includes the apparatus provided in the second aspect, or the terminal includes the apparatus provided in the third aspect, or the terminal includes the apparatus provided in the fourth aspect.

According to a seventh aspect, this application provides a program. When executed by a processor, the program is configured to perform the method provided in the first aspect or any possible implementation of the first aspect.

This application provides a program product, for example, a computer-readable storage medium, including the foregoing program.

It can be learned that, in the foregoing aspects, when a data packet is in the undelivered state due to a limitation of the reordering timer during waiting for a disordered data packet to be received, even if the reordering timer is in the running state (not timed out), the data packet can be delivered upon an arrival of a delay cut-off moment corresponding to the data packet or an arrival of a delay cut-off moment of a data packet before the data packet in the reordering window. Delivery of each data packet is no longer limited by the reordering timer. In this way, a problem of data packet delivery timeout that may be caused by the limitation of the reordering timer is resolved, thereby meeting a data packet delay requirement and improving data packet transmission efficiency.

DESCRIPTION OF EMBODIMENTS

Figure 1:
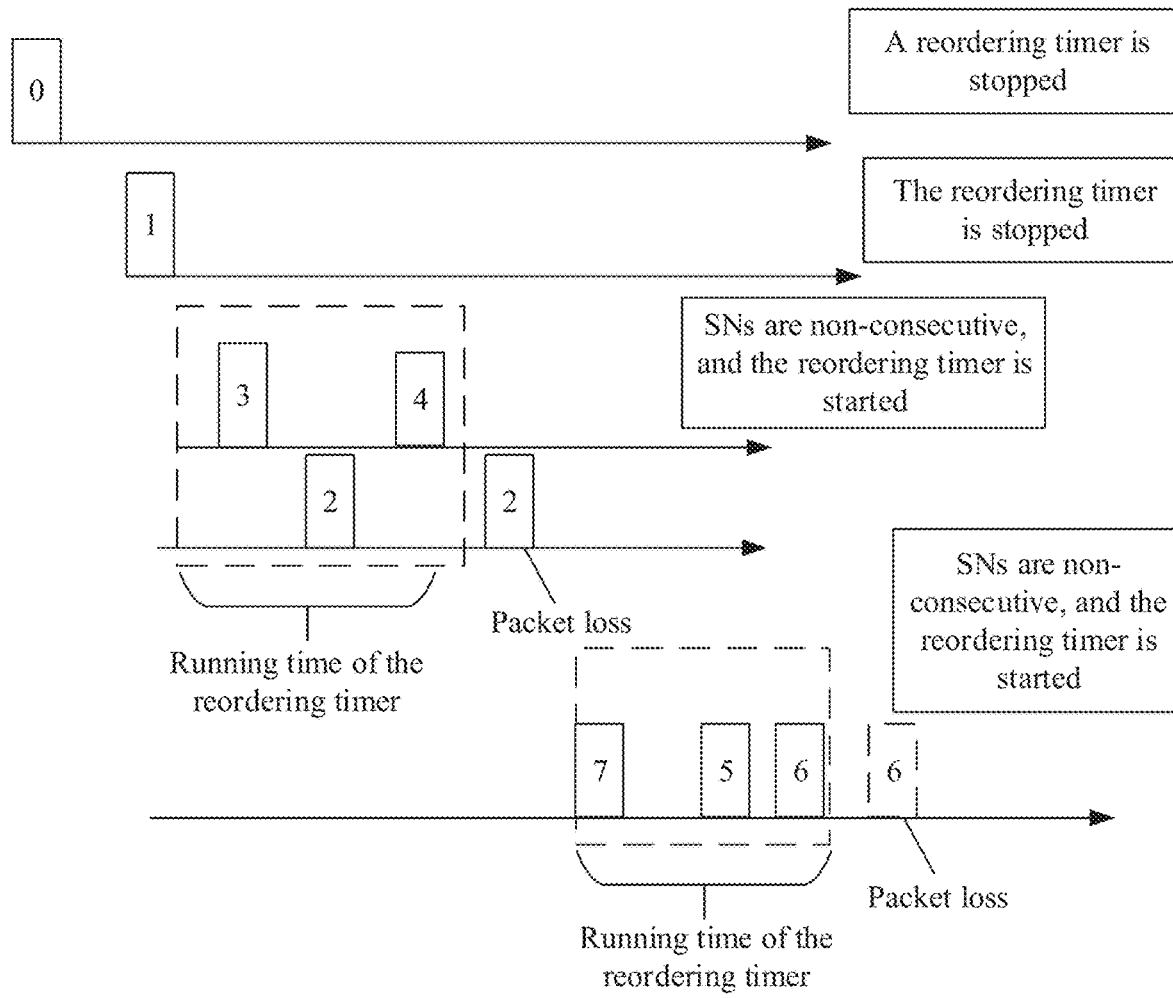
FIG. 1 is a schematic diagram of data packet reordering and delivery performed by a PDCP entity of a receiving device.

The following describes the technical solutions in this application with reference to the accompanying drawings.

Some terms of this application are first described.

A terminal is also referred to as user equipment (UE), a mobile station (MS), a mobile terminal (MT), or the like, is a device that provides voice/data connectivity to a user, for example, a handheld device having a wireless connection function or a vehicle-mounted device. Currently, some examples of the terminal are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home. This is not limited in embodiments of this application.

A network device is a device in a wireless network that is used to communicate with a terminal, for example, a radio access network (RAN) node that connects a terminal to a wireless network. Currently, some examples of the RAN node are: a gNB, a transmission reception point (TRP), an evolved NodeB (eNB), a radio network controller (RNC), a NodeB (NB), a base station controller (BSC), a base transceiver station (BTS), a home base station (HNB), a base band unit (BBU), or a wireless fidelity (Wi-Fi) access point (AP). In a network structure, the network device may include a centralized unit (CU) node, a distributed unit (DU) node, or a RAN device including a CU node and a DU node. This is not limited in the embodiments of this application.

The term "a plurality of" means two or more, and other quantifiers have similar meanings. The term "and/or" describes an association relationship between associated objects and represents that three relationships may exist. For example, A and/or B may represent the following three cases: Only A exists, both A and B exist, and only B exists. In addition, an element that appears in singular forms "a", "an", and "the" does not mean "one or only one" unless otherwise specified in the context, but means "one or more".

For example, "a device" means one or more such devices. Further, "at least one (at least one of) . . . " means one or any combination of subsequent associated objects. For example, "at least one of A, B, and C" includes A, B, C, AB, AC, BC, or ABC.

In some embodiments of this application, the terminal or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). An operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, the embodiments of this application do not particularly limit a specific structure of an execution entity of the method provided in the embodiments of this application, provided that a program recording code of the method provided in the embodiments of this application can be run to implement communication according to the method provided in the embodiments of this application. For example, the execution entity of the method provided in the embodiments of this application may be a terminal or a network device, or may be a functional module that can invoke and execute a program in the terminal or the network device.

In addition, aspects or features of this application may be implemented as a method, an apparatus or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

With development of wireless communications technologies, wireless communication (for example, a fifth generation (5G) system or New Radio (NR) communication) can meet increasingly high communications requirements. In a future industry or a future power network, there have been increasing considerations of using wireless communication as a transmission mode between devices. An advantage of wireless communication lies in that no physical line needs to be deployed between a controller (a network device is used as an example) and a controllee (a terminal is used as an example). This reduces costs and increases mobility support for a system, and the terminal can be randomly moved around. In addition, for some plant areas and factories, production lines need to be customized and reorganized based on requirements at any time. It is more convenient to reorganize a production line equipped with a wireless communications system. In the industrial or power scenario, a requirement on a communications indicator is high, and control signaling needs to be transmitted with high reliability assurance in short time. For example, in a control scenario, a network device usually periodically transmits instructions to a terminal, to instruct the terminal how to act. In most cases, the control instructions need to be transmitted in sequence. If the control instructions are disordered, the terminal may execute the control instructions based on an incorrect instruction order. This may cause a device failure and even a huge personal and property safety loss.

For example, the network device sends a plurality of command messages (for example, data packets) to the terminal based on a fixed period in a command message order. If a transmission delay of the command messages is relatively stable, that is, a transmission delay jitter is relatively small, the command messages reach the terminal in sequence. However, due to wireless channel instability, in some cases, a former command message may be retransmitted a plurality of times, while a latter command message is successfully transmitted at one try. As a result, the latter command message arrives at the terminal earlier than the former command message. If the terminal directly executes commands based on an order in which the command messages are received, the latter command is incorrectly executed first. This leads to an incorrect execution result. A network layer of the terminal may perform reordering to ensure that messages delivered by the network layer to an application layer are sequential.

Communication between the network device and the terminal complies with a specific protocol layer structure. For example, a protocol layer structure on a control plane may include functions of protocol layers such as a radio resource control (RRC) layer, a PDCP layer, an RLC layer, a Media Access Control (MAC) layer, and a physical layer. A protocol layer structure on a user plane may include functions of protocol layers such as a PDCP layer, an RLC layer, a MAC layer, and a physical layer. The physical layer is a lowest layer (layer 1), the MAC layer, the RLC layer, and the PDCP layer belong to a second layer (layer 2), and the RRC layer belongs to a third layer (layer 3). In an implementation, a service data adaptation protocol (SDAP) layer may be further included above the PDCP layer.

In over-the-air transmission, although data packets are sequentially sent over an air interface at a transmit end, the data packets may be disorderly received at a receive end due to wireless channel instability. In an acknowledge mode (AM), it needs to be ensured that received PDCP protocol data units (PDCP PDUs) are delivered to an upper layer or a core network device in sequence. Currently, a PDCP layer and an RLC layer in protocol layers of each of the network device and the terminal support a data packet reordering function. Description is provided by using an example in which a PDCP entity of a receiving device (for example, a terminal or a network device) reorders data packets.

FIG. 1 is a schematic diagram of data packet reordering and delivery performed by the PDCP entity of the receiving device. Each small rectangle in FIG. 1 represents one PDCP PDU, and a number thereon represents a sequence number (SN) of the data packet. The SN may be understood as a serial number of the PDCP PDU. It is assumed that the SN ranges from 0 to 1023. For a reordering window (referred to as "window" for short below), a lower boundary SN of the window is 0, and an upper boundary SN of the window is 511 during initialization. A window length is equal to the upper boundary SN minus the lower boundary SN. The window length is generally defined in a protocol, and a value of the window length may be equal to SN/2. A data packet received by the PDCP entity of the receiving device is processed by the PDCP entity only when an SN of the data packet is within the reordering window of the PDCP. The reordering window is sliding, and SNs periodically appear. For example, an absolute value of a difference between the upper boundary SN and the lower boundary SN of the reordering window is 511. However, a value range of the upper boundary SN may be 0 to 1023, and a value range of the lower boundary SN may also be 0 to 1023. When the value range of the upper boundary SN of the reordering window is from 512 to 1023, a value of the lower boundary SN is less than a value of the upper boundary SN. However, when the value range of the upper boundary SN of the reordering window is from 0 to 512, the value of the lower boundary SN is greater the value of the upper boundary.

As shown in FIG. 1, it is assumed that the lower boundary SN of the current reordering window is 0 and the upper boundary SN of the current reordering window is 512. When the PDCP layer entity of the receiving device receives a PDCP PDU whose SN is 0, the PDCP layer entity processes the current PDCP PDU whose SN is 0, to obtain a PDCP service data unit (PDCP SDU), and directly delivers the PDCP SDU whose SN is 0 to an upper layer. A PDCP SDU obtained after processing a PDCP PDU has a same SN as the corresponding PDCP PDU before processing. After the PDCP layer entity delivers the PDCP SDU whose SN is 0, the window is slid rightwards by one SN, that is, the value of the lower boundary SN of the window changes to 1, and the upper boundary SN of the window changes to 512. In addition, an SN of a previous delivered PDCP SDU changes to 0. The SN of the previous PDCP SDU may be represented by "Last_Submitted_PDCP_RX_SN". The lower boundary SN of the window indicates an SN of a next PDCP SDU expected to be received, and the SN of the next PDCP PDU expected to be received may be represented by "Next_PDCP_RX_SN". The lower boundary SN of the window may be equal to a value of Next-PDCP-RX-SN or equal to the value of Next-PDCP-RX-SN minus 1. In this application, that the lower boundary SN of the window is equal to the value of Next-PDCP-RX-SN is used as an example for description. A PDCP PDU whose SN is 1 and that is subsequently received by the PDCP layer entity is also processed to obtain a PDCP SDU whose SN is 1, and the PDCP SDU whose SN 1 is immediately delivered, and the window is slid rightwards. In this case, the lower boundary SN of the window changes to 2, and the upper boundary SN is 513. That the lower boundary SN of the window changes to 2 indicates that an SN of a next PDCP PDU expected to be received is 2, and the SN of the previous delivered PDCP SDU changes to 1.

Because the SN of the previous sequentially delivered PDCP SDU is 1, a next PDCP PDU whose SN is 2 should be received in a normal case. After receiving a PDCP PDU whose SN is 3, the PDCP layer of the receiving device considers that disordered transmission occurs, starts a reordering timer (t-Reordering), and stores the PDCP PDU whose SN is 3 at the PDCP layer. If the PDCP PDU whose SN is 2 arrives in a running process of the reordering timer, the PDCP layer entity of the receiving device sequentially delivers both a PDCP SDU whose SN is 2 and a PDCP SDU whose SN is 3 to the upper layer, and stops the reordering timer, and slides the window by two SNs. That is, the lower boundary SN of the window changes to 4 and the upper boundary SN of the window changes to 515. Otherwise, if the PDCP PDU whose SN is 2 has not been received at a timeout moment of the reordering timer, the PDCP SDU whose SN is 3 is directly delivered at the timeout moment of the reordering timer, and the window is slid by two SNs. That is, the lower boundary SN of the window changes to 4, and the upper boundary SN of the window changes to 515. This means that the PDCP PDU whose SN is 2 is discarded, that is, it is considered that the PDCP SDU whose SN is 2 already becomes invalid, and the SN of 2 no longer exists in the reordering window. Because the reordering window is sliding and SNs appear periodically, the PDCP SDU whose SN is 2 is not delivered before the reordering window includes the SN of 2 again.

If a PDCP PDU whose SN is 4 is further received before the reordering timer times out, the PDCP PDU whose SN is 3 and the PDCP PDU whose SN is 4 are processed and jointly delivered at the timeout moment of the reordering timer, and the window is slid by one more SN. That is, the lower boundary SN of the window changes to 5, and the upper boundary SN of the window changes to 516. The SN of 5 indicates that a next PDCP PDU expected to be received is a PDCP PDU whose SN is 5.

After the PDCP PDU whose SN is 3 and the PDCP PDU whose SN is 4 are processed and jointly delivered, if a PDCP PDU whose SN is 7 is received, a next PDCP PDU expected to be received is the PDCP PDU whose SN is 5. If a PDCP PDU is disordered, the reordering timer is restarted. During running of the reordering timer, if the PDCP PDU whose SN is 5 is received, the PDCP PDU whose SN is 5 is processed and then delivered. At this time, the reordering timer is not stopped, and the window is slid by one SN. That is, the lower boundary SN of the window changes to 6, and the upper boundary SN of the window changes to 517. The SN of 6 indicates that a next PDCP PDU expected to be received is a PDCP PDU whose SN is 6.

If the PDCP PDU whose SN is 6 is further received before the reordering timer times out (during running of the reordering timer), the PDCP PDU whose SN is 6 and the PDCP PDU whose SN is 7 are processed and jointly delivered, and the window is slid by two SNs. That is, the lower boundary SN of the window changes to 8, and the upper boundary SN of the window changes to 518, and the reordering timer is stopped. Before the reordering timer times out (during running of the reordering timer), if the PDCP PDU whose SN is 6 has not been received, a PDCP SDU whose SN is 7 is directly delivered at a timeout moment of the reordering timer, and the window is slid by two SNs. That is, the lower boundary SN of the window changes to 8, and the upper boundary SN of the window changes to 518. This means that the PDCP PDU whose SN is 6 is discarded, that is, it is considered that the PDCP SDU whose SN is 6 already becomes invalid, and no PDCP SDU whose SN is 6 is delivered subsequently.

One piece of quality of service (QoS) information is configured for each data radio bearer (DRB), and the QoS information includes a delay requirement and a reliability requirement on transmission of a data packet carried by the DRB. Because a length of a reordering timer corresponding to each DRB is fixed, a plurality of PDCP PDUs carried by one DRB are corresponding to one reordering timer with a fixed duration. As a result, a PDCP PDU does not meet a delay requirement of the PDCP PDU due to a limitation of the reordering timer. For example, in the example shown in FIG. 1, once the PDCP PDU whose SN is 2 is lost in transmission, regardless of when the PDCP PDU whose SN is 3 arrives, the arrival of the PDCP PDU whose SN is 3 triggers the reordering timer to start. The PDCP SDU whose SN is 3 can be delivered only when the reordering timer times out, and a time elapsed since transmission of the PDCP PDU whose SN is 3 is not considered. The time elapsed since the transmission of the PDCP PDU whose SN is 3 may be understood as a period of time starting from a moment at which the PDCP PDU whose SN is 3 arrives at an entry of a PDCP layer of a sending device to a moment at which the PDCP PDU whose SN is 3 arrives at an entry of the PDCP layer of the receiving device. Because the PDCP SDU whose SN is 3 can be delivered only after the reordering timer times out, a waiting time of the PDCP SDU whose SN is 3 resulted from the reordering timer plus the time elapsed since the transmission does not meet a delay requirement of the PDCP SDU whose SN is 3. Consequently, the PDCP SDU whose SN is 3 times out due to waiting for the PDCP SDU whose SN is 2. This severely affects transmission efficiency of the PDCP SDU whose SN is 3 and affects communication efficiency.

In view of this, this application provides a data packet transmission method. When a data packet is in an undelivered state due to waiting for a disordered data packet to be received, the data packet can be delivered at a delay cut-off moment corresponding to the data packet. For example, the data packet may be delivered at a delay cut-off moment corresponding to the data packet or before the cut-off moment. Delivery of each data packet is no longer limited by a limitation of a waiting duration for waiting for a disordered packet to be received (for example, a limitation of a reordering timer). In this way, a problem of data packet delivery timeout that may be caused by disordered receiving is resolved, thereby meeting a data packet delay requirement and improving data packet transmission efficiency.

For ease of understanding the embodiments of this application, a communications system to which the embodiments of this application are applicable is first briefly described with reference to FIG. 2.

Figure 2:
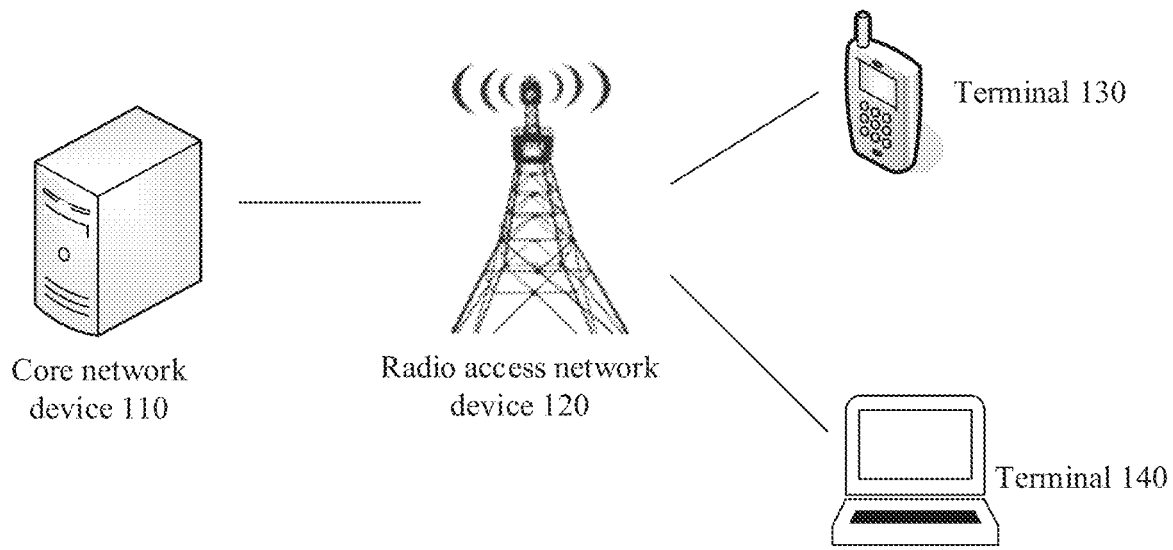
FIG. 2 is a schematic diagram of a network architecture to which embodiments of this application are applicable.

FIG. 2 is a schematic diagram of a communications system to which the embodiments of this application are applicable. As shown in FIG. 2, the mobile communications system 100 may include a core network device 110, a radio access network device 120, and at least one terminal device (for example, a terminal device 130 and a terminal device 140 that are shown in FIG. 2). The terminal is connected to the radio access network device in a wireless manner, and the radio access network device is connected to the core network device in a wireless or wired manner. The core network device and the radio access network device may be independent and different physical devices, or a function of the core network device and a logical function of the radio access network device may be integrated into a same physical device, or some functions of the core network device and some functions of the radio access network device may be integrated into one physical device. The terminal may be at a fixed location, or may be mobile. The terminal may transmit an uplink data packet to the radio access network device 120, and the radio access network device 120 sends the uplink data packet to the core network device 110. The radio access network device 120 may also transmit, to the terminal, a downlink data packet from the core network device 110. Further, the uplink data packet or the downlink data packet is sensitive to a transmission delay, and has a requirement on sequential transmission and delivery.

The radio access network device may include a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. For example, in a long term evolution (LTE) communications system, a radio access network device includes a baseband apparatus and a radio frequency apparatus. The radio frequency apparatus may be remotely disposed relative to the baseband apparatus. For example, a remote radio unit (RRU) is remotely disposed relative to a BBU.

Communication between the terminal and the radio access network device complies with a specific protocol layer structure. For example, protocol layers of the radio access network device are a physical layer, a MAC layer, an RLC layer, a PDCP layer, an RRC layer, and the like from bottom to top. Protocol layers of the terminal are a physical layer, a MAC layer, an RLC layer, a PDCP layer, an RRC layer, and the like from bottom to top.

The functions of these protocol layers may be implemented by one node, or may be implemented by a plurality of nodes. For example, in an evolved structure, a radio access network device may include a centralized unit (CU) and a distributed unit (DU). A plurality of DUs may be centrally controlled by one CU. The CU and the DU may be centrally controlled by one CU. The CU and the DU may be allocated based on the protocol layers of a wireless network. For example, functions of the PDCP layer and the protocol layers above the PDCP layer are allocated to the CU, and functions of the protocol layers below the PDCP layer such as the RLC layer and the MAC layer are allocated to the DU. Division based on the protocol layer is merely an example, and division may alternatively be performed based on another protocol layer, such as the RLC layer. Functions of the RLC layer and a protocol layer above the RLC layer are allocated to the CU, and functions of a protocol layer below the RLC layer are allocated to the DU. Alternatively, division is performed at a protocol layer. For example, some functions of the RLC layer and functions of a protocol layer above the RLC layer are allocated to the CU, and a remaining function of the RLC layer and functions of a protocol layer below the RLC layer are allocated to the DU. In addition, division may alternatively be performed in another manner. For example, division is performed based on a delay. A function whose processing time needs to meet a delay requirement is allocated to the DU, and a function whose processing time does not need to meet the delay requirement is allocated to the CU.

In addition, the radio frequency apparatus may be not placed in the DU but is placed remotely from the DU, or may be integrated into the DU, or a part is placed remotely from the DU and a remaining part is integrated into the DU. This is not limited herein.

It should be understood that, FIG. 2 is merely a schematic diagram, and the communications system may further include another network device, for example, may further include a wireless relay device and a wireless backhaul device, which are not drawn in FIG. 2. Quantities of core network devices, radio access network devices, and terminals included in the mobile communications system are not limited in this embodiment of this application. In the mobile communications system 100, the radio access network device 120 may be the foregoing network device.

Figure 3:
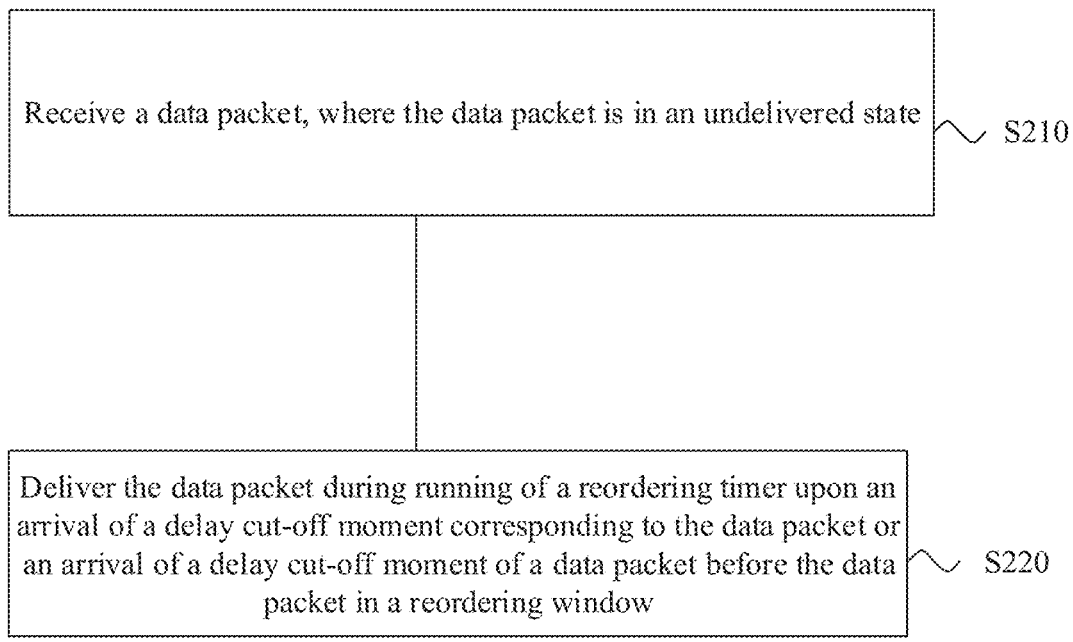
FIG. 3 is a schematic flowchart of a data packet transmission method according to an embodiment of this application.

The following describes in detail a data packet transmission method provided in this application with reference to FIG. 3. FIG. 3 is a schematic flowchart of a data packet transmission method 200 according to an embodiment of this application. The method 200 may be applied to the scenario shown in FIG. 2, for example, may be applied to scenarios that are sensitive to a data packet transmission delay and that have a requirement on sequential data packet transmission and delivery, including scenarios such as engineering automation and process control. This is not limited herein in this embodiment of this application.

It should be understood that, in the following descriptions, an example in which the method in the embodiments is performed by a receiving device is used to describe the method in the embodiments. A receiving device may be the terminal or the access network device described above. Correspondingly, a sending device may be the access network device or the terminal. As an example rather than a limitation, the method may alternatively be executed by a chip applied to the receiving device. The receiving device may be a terminal, a network device, or the like. More specifically, the method may be executed by an RLC layer entity or a PDCP layer entity of the receiving device, or certainly may be another entity having a same reordering function.

As shown in FIG. 3, the method 200 shown in FIG. 3 may include step S210 and step S220. The following describes the steps in the method 200 in detail with reference to FIG. 3. The method 200 includes the following steps.

S210. A receiving device receives a data packet, where the data packet is in an undelivered state.

S220. The receiving device delivers the data packet during running of a reordering timer upon an arrival of a delay cut-off moment corresponding to the data packet or an arrival of a delay cut-off moment of a data packet before the data packet in a reordering window.

Specifically, in S210, the receiving device receives the data packet. For ease of description, the following provides a description by using an example in which an $N^{th}$ data packet is received. N is a positive integer. Herein, N may be understood as an SN of the data packet, or may be understood as a count value COUNT of the data packet. A minimum value of the SN or COUNT of the data packet is 0, and the data packet may be a PDCP PDU or the like. The sending device sends data packets sequentially. In one SN period, a value range of SNs of the data packets is 0 to 1023. In other words, in one SN period, the sending device sends the data packets sequentially in ascending order of the sequence numbers (SNs) of the data packets. A data packet with a smaller SN is sent earlier than a data packet with a larger SN, and a data packet with an SN of 0 is sent first. However, when the receiving device receives the data packet sent by the sending device, a disorder may occur. For example, when a value range of an upper boundary SN of the reordering window is from 512 to 1023, if a data packet with a larger SN is received first and a data packet with a smaller SN is received later in the reordering window, disordered receiving is caused.

When the receiving device receives the $N^{th}$ data packet, the $N^{th}$ data packet is in the undelivered state. "The $N^{th}$ data packet is in the undelivered state" may be understood as that the $N^{th}$ data packet is in a state in which the $N^{th}$ data packet is waiting for a data packet before the $N^{th}$ data packet in the reordering window to be received and has not been delivered to an upper layer. The upper layer may be understood as a protocol layer higher than the RLC layer or the PDCP layer. For example, the upper layer may include the RRC layer and an SDAP layer, or the upper layer may be understood as a core network device. The data packet before the $N^{th}$ data packet in the reordering window may be understood as a data packet that is closer to a lower boundary of the reordering window in time domain than the $N^{th}$ data packet. An SN of the data packet before the $N^{th}$ data packet in the reordering window may be greater than or less than N. For example, when the value range of the upper boundary SN of the reordering window is from 512 to 1023, that is, the reordering window is in one SN period, the data packet before the $N^{th}$ data packet in the reordering window may be a data packet whose SN is less than N. When the value range of the upper boundary SN of the reordering window is from 0 to 511, that is, the reordering window may cross boundaries of two SN periods, in this case, the data packet before the $N^{th}$ data packet in the reordering window may be a data packet whose SN is less than N, or may be a data packet whose SN is greater than N. For example, it is assumed that an upper boundary of the reordering window is 368 of a second SN period, and the lower boundary of the reordering window is 879 of a first SN period. If the $N^{th}$ data packet is in the first SN period, the data packet before the $N^{th}$ data packet in the reordering window may be a data packet whose SN is less than N. If the $N^{th}$ data packet is in the second SN period, the data packet before the $N^{th}$ data packet in the reordering window may include any one or more of data packets whose SNs are 879 to 1023 in the first SN period and are 0 to N in the second SN period.

The receiving device may disorderly receive the $N^{th}$ data packet, instead of receiving $N^{th}$ data packet based on the sequence number of the data packet. For example, it is assumed that N is equal to 4, and the receiving device has received and delivered a $1^{st}$ data packet and a $2^{nd}$ data packet, and receives a $4^{th}$ data packet at this time. The $4^{th}$ data packet needs to wait for a $3^{rd}$ data packet to be received and is in a waiting state, that is, the $4^{th}$ data packet is in the undelivered state.

Because the $N^{th}$ data packet is in the undelivered state, the reordering timer is in a running state. The reordering timer (t-Reordering) is started when a disordered packet is received. When the $N^{th}$ data packet is received, the reordering timer is in the running state. The reordering timer may be triggered to start by receiving of the $N^{th}$ data packet, that is, the reordering timer is started only when the receiving device receives the $N^{th}$ data packet. For example, it is assumed that N is 4, and the receiving device has received a $1^{st}$ data packet and a $2^{nd}$ data packet, and has delivered the $1^{st}$ data packet and the $2^{nd}$ data packet to the upper layer or the core network device before receiving the $4^{th}$ data packet. Then, the receiving device receives the $4^{th}$ data packet. At this time, disordered data packet receiving occurs because a $3^{rd}$ data packet has not been received. Therefore, the reordering timer is started. That is, the reordering timer is started because the $4^{th}$ data packet is received. The reordering timer is started to wait for the $3^{rd}$ data packet to be received. Certainly, the reordering timer may alternatively be triggered to start by a data packet received before the $N^{th}$ data packet. In other words, when the receiving device receives the $N^{th}$ data packet, the reordering timer is already in the running state. For example, it is assumed that N is 5, and the receiving device has received a $1^{st}$ data packet, a $2^{nd}$ data packet, and a $4^{th}$ data packet before receiving a $5^{th}$ data packet. Because the $1^{st}$ data packet and the $2^{nd}$ data packet are sequentially received, the receiving device delivers the $1^{st}$ data packet and the $2^{nd}$ data packet. Because a $3^{rd}$ data packet has not been received but the $4^{th}$ data packet has been received, the $4^{th}$ data packet triggers the reordering timer to start, and the reordering timer is started to wait for the $3^{rd}$ data packet to be received. After receiving the $4^{th}$ data packet, the receiving device receives the $5^{th}$ data packet. When the $5^{th}$ data packet is received, the reordering timer is already in the running state. That is, the reordering timer is not triggered to start by the receiving of the $5^{th}$ data packet.

In S220, the $N^{th}$ data packet is delivered to the upper layer during running of the reordering timer upon an arrival of a delay cut-off moment corresponding to the $N^{th}$ data packet or an arrival of a delay cut-off moment corresponding to the data packet before the $N^{th}$ data packet in the reordering window.

Specifically, after receiving the $N^{th}$ data packet, the receiving device may ignore a limitation of the reordering timer even if the reordering timer is in the running state (the reordering timer is still running), and delivers the $N^{th}$ data packet to the upper layer upon the arrival of the delay cut-off moment corresponding to the $N^{th}$ data packet or the arrival of the delay cut-off moment of the data packet before the $N^{th}$ data packet in the reordering window. The delay cut-off moment corresponding to the $N^{th}$ data packet may also be referred to as a latest delivery time or a delivery deadline time corresponding to the $N^{th}$ data packet, or may also be referred to as a timeout moment of a time to live corresponding to the $N^{th}$ data packet. The upper boundary and the lower boundary of the reordering window change dynamically. For example, when one data packet is delivered, values of the upper boundary and the lower boundary of the reordering window are separately increased by 1. It should be understood that, because the SNs are cyclic, for example, the value range of the SNs is 0 to 1023, when the upper boundary SN or the lower boundary SN of the reordering window is 1023, the value of the upper boundary or the value of the lower boundary of the reordering window is 0 after being increased by 1, which indicates a $1^{st}$ data packet in a next SN period.

In a possible case, the delay cut-off moment of the data packet before the $N^{th}$ data packet in the reordering window may be earlier than the delay cut-off moment of the $N^{th}$ data packet. Specifically, because the sending device sends each data packet at a different sending moment, a delay cut-off moment (a latest delivery time) corresponding to each data packet is also different. A sending moment of a data packet may be understood as a moment at which the data packet arrives at an entry of the PDCP layer of the sending device. It is assumed that all data packets carried by one DRB have a same delay budget. A delay budget may be understood as a delay requirement or a maximum tolerance delay of a data packet. For example, it is assumed that a delay requirement of all data packets carried by one DRB is 5 ms, and a sending moment at which the sending device sends a $1^{st}$ data packet is T0. In this case, the receiving device should deliver the $1^{st}$ data packet to the upper layer at a latest moment of T0+5 ms. Otherwise, the $1^{st}$ data packet does not meet the delay requirement. That is, a delay cut-off moment of the $1^{st}$ data packet is T0+5 ms. It is assumed that a sending moment at which the sending device sends a $2^{nd}$ data packet is T0+1 ms. In this case, the receiving device should deliver the $2^{nd}$ data packet to the upper layer at a latest moment of T0+6 ms. Otherwise, the $2^{nd}$ data packet does not meet the delay requirement. That is, a delay cut-off moment of the 2nd data packet is T0+6 ms. It can be learned that, because the sending device sends each data packet at a different sending moment, and each data packet corresponds to the same delay requirement. Therefore, each data packet also corresponds to a different delay cut-off moment. A data packet with an earlier sending moment has an earlier delay cut-off moment, and a data packet with a later sending moment has a later cut-off moment of a maximum delay. In this case, the $N^{th}$ data packet may be delivered to the upper layer upon the arrival of the delay cut-off moment corresponding to the data packet before the $N^{th}$ data packet or the arrival of the delay cut-off moment corresponding to the $N^{th}$ data packet.

In another possible case, if some or all data packets on one DRB each have a different delay requirement, the delay cut-off moment of the data packet before the $N^{th}$ data packet may be later than the delay cut-off moment of the $N^{th}$ data packet. In this case, the $N^{th}$ data packet may be delivered to the upper layer upon the arrival of the delay cut-off moment corresponding to the $N^{th}$ data packet.

In the data packet transmission method provided in this application, when a data packet is in the undelivered state due to a limitation of the reordering timer during waiting for a disordered data packet to be received, even if the reordering timer is in the running state (not timed out), the data packet can be delivered upon an arrival of a delay cut-off moment corresponding to the data packet or an arrival of a delay cut-off moment of a data packet before the data packet in the reordering window. Delivery of each data packet is no longer limited by the reordering timer. In this way, a problem of data packet delivery timeout that may be caused by the limitation of the reordering timer is resolved, thereby meeting a data packet delay requirement and improving data packet transmission efficiency.

Optionally, in some other possible implementations of this application, the delay cut-off moment corresponding to the data packet before the $N^{th}$ data packet in the reordering window is a delay cut-off moment corresponding to a data packet with an earliest delay cut-off moment in a data packet that is before the $N^{th}$ data packet in the reordering window and whose delay cut-off moment does not time out.

Specifically, the delay cut-off moment corresponding to the data packet with the earliest delay cut-off moment in the data packet that is before the $N^{th}$ data packet in the reordering window and whose delay cut-off moment does not time out may be used as a moment for delivering the $N^{th}$ data packet and a data packet consecutive to the $N^{th}$ data packet. A data packet whose delay cut-off moment does not time out may be understood as a data packet whose delay cut-off moment is later than a moment at which the $N^{th}$ data packet is received. That is, if the moment at which the receiving device receives the $N^{th}$ data packet is earlier than a delay cut-off moment of a specific data packet, this data packet is a data packet whose delay cut-off moment does not time out. For example, it is assumed that the receiving moment of the $N^{th}$ data packet is a T0 moment. If a delay cut-off moment of a specific data packet, is later than the T0 moment, this data, packet is a data packet whose delay cut-off moment does not time out. If a delay cut-off moment of a specific data packet is earlier than the T0 moment, this data packet is a data packet whose delay cut-off moment has timed out. The moment for delivering the $N^{th}$ data packet may be the delay cut-off moment of the data packet with the earliest delay cut-off moment in the data packet that is in the reordering window and whose delay cut-off moment does not time out. A data packet, whose delay cut-off moment does not time out may be a data packet that has been stored in the reordering window, or may be a data packet that has not been received (not stored) in the reordering window.

For example, it is assumed that N is 5, the value range of the upper boundary SN of the reordering window is from 512 to 1023, and the delay cut-off moment of the data packet before the $N^{th}$ data packet in the reordering window is earlier than the delay cut-off moment of the $N^{th}$ data packet. It is further assumed that the receiving device has received and delivered a $1^{st}$ data packet and a $2^{nd}$ data packet, and the receiving device has not received a $3^{rd}$ data packet and a $4^{th}$ data packet but receives a $5^{th}$ data packet at this time. The $5^{th}$ data packet is in a waiting state of waiting for the $3^{rd}$ data packet and the $4^{th}$ data packet to be received. The $5^{th}$ data packet triggers the reordering timer to start. It is assumed that the $4^{th}$ data packet is received but the $3^{rd}$ data packet is not during running of the reordering timer. It is further assumed that a timeout moment, of the reordering timer is later than a delay cut-off moment of the $3^{rd}$ data, packet. If the $3^{rd}$ data packet has not been received upon an arrival of the delay cut-off moment of the $3^{rd}$ data packet, it means that the $3^{rd}$ data packet already becomes invalid. At the delay cut-off moment of the 3rd data packet, the values of the lower boundary and the upper boundary of the reordering window are separately increased by 1, and therefore the lower boundary SN of the reordering window changes to 4. In addition, the received data packets consecutive to the $3^{rd}$ data packet are delivered, where the received data packets consecutive to the $3^{rd}$ data packet are the $4^{th}$ data packet and the $5^{th}$ data packet. Therefore, the $4^{th}$ data packet and the $5^{th}$ data packet are delivered at the delay cut-off moment of the $3^{rd}$ data packet. Then, the values of the lower boundary and the upper boundary of the reordering window are separately increased by 2, and therefore the lower boundary SN of the reordering window changes to 6, and the reordering timer is stopped. Data packets that are before the $5^{th}$ data packet, and whose delay cut-off moment does not time out include the $3^{rd}$ data packet and the $4^{th}$ data packet, and the $3^{rd}$ data packet, is a data packet with an earliest delay cut-off moment in the data packets whose delay cut-off moment does not time out.

Optionally, in some other possible implementations of this application, the delay cut-off moment corresponding to the data packet before the $N^{th}$ data packet, in the reordering window is a delay cut-off moment corresponding to a first unreceived data packet counted forward from the $N^{th}$ data packet in the reordering window. "Counted forward from the $N^{th}$ data packet" may be understood as being counted from the $N^{th}$ data packet in the reordering window in a direction for approaching the lower boundary of the reordering window in time domain. For example, when the value range of the upper boundary SN of the reordering window is 512 to 1023, an SN of the first unreceived data packet counted forward from the $N^{th}$ data packet is less than N.

For example, it is assumed that N is 4, the value range of the upper boundary SN of the reordering window is from 512 to 1023, and the delay cut-off moment of the data packet before the $N^{th}$ data packet in the reordering window is earlier than the delay cut-off moment of the $N^{th}$ data packet. The receiving device has received and delivered a $1^{st}$ data packet and a $2^{nd}$ data packet but has not received a $3^{rd}$ data packet, and a $4^{th}$ data packet is in a waiting state of waiting for the $3^{rd}$ data, packet to be received. The $4^{th}$ data packet triggers the reordering timer to start. If the $3^{rd}$ data, packet has not been received upon an arrival of a delay cut-off moment of the $3^{rd}$ data packet, and the reordering timer does not time out, it means that the $3^{rd}$ data packet already becomes invalid. At the delay cut-off moment of the $3^{rd}$ data packet, the values of the lower boundary and the upper boundary of the reordering window are separately increased by 1, and therefore the lower boundary SN of the reordering window changes to 4. In addition, a received data packet consecutive to the $3^{rd}$ data packet is delivered, where the received data packet consecutive to the $3^{rd}$ data packet is the $4^{th}$ data packet. Therefore, the $4^{th}$ data packet is delivered at the delay cut-off moment of the $3^{rd}$ data packet, and the reordering timer is stopped. Then, the values of the lower boundary and the upper boundary of the reordering window are separately increased by 1, and therefore the lower boundary SN of the reordering window changes to 5. The $3^{rd}$ data packet is a first unreceived data packet counted forward from the $4^{th}$ data packet.

Optionally, in some other possible implementations of this application, the delay cut-off moment corresponding to the data, packet before the $N^{th}$ data packet in the reordering window is a delay cut-off moment of a data packet previous to the $N^{th}$ data packet in the reordering window.

Specifically, the delay cut-off moment of the data packet, previous to the $N^{th}$ data packet in the reordering window may be used as a moment for delivering the $N^{th}$ data packet and a data packet consecutive to the $N^{th}$ data, packet.

For example, it is assumed that N is 5, the value range of the upper boundary SN of the reordering window is from 512 to 1023, and the delay cut-off moment of the data packet before the $N^{th}$ data packet in the reordering window is earlier than the delay cut-off moment of the $N^{th}$ data packet. It is assumed that the receiving device has received and delivered a $1^{st}$ data packet and a $2^{nd}$ data packet but has not received a $3^{rd}$ data packet and a $4^{th}$ data packet, and a $5^{th}$ data packet is in a waiting state of waiting for the $3^{rd}$ data packet and the $4^{th}$ data packet to be received. The $5^{th}$ data packet triggers the reordering timer to start. It is assumed that a timeout moment of the reordering timer is later than a delay cut-off moment of the $3^{rd}$ data packet. During miming of the reordering timer, if the $4^{th}$ data packet has not been received, and the $3^{rd}$ data packet has not been received upon an arrival of the delay cut-off moment of the $3^{rd}$ data packet, it means that the $3^{rd}$ data packet already becomes invalid. At the delay cut-off moment of the $3^{rd}$ data, packet, the values of the lower boundary and the upper boundary of the reordering window are separately increased by 1, and therefore the lower boundary SN of the reordering window changes to 4. In this case, the reordering timer may be restarted or continue to be run, and a received data packet consecutive to the $3^{rd}$ data packet is delivered. However, the $4^{th}$ data packet consecutive to the $3^{rd}$ data packet has not been received, and therefore the $5^{th}$ data, packet has not been delivered. If a delay cut-off moment of the $4^{th}$ data packet is earlier than the timeout moment of the reordering timer, and the $4^{th}$ data packet has not been received upon an arrival of the delay cut-off moment of the $4^{th}$ data packet, it means that the $4^{th}$ data packet already becomes invalid. At the delay cut-off moment of the $4^{th}$ data packet, the values of the lower boundary and the upper boundary of the reordering window are separately increased by 1, and therefore the lower boundary SN of the reordering window changes to 5, and a received data packet consecutive to the $4^{th}$ data packet is delivered. The $5^{th}$ data packet consecutive to the $4^{th}$ data packet has been received. Therefore, the $5^{th}$ packet is delivered. Then, the values of the lower boundary and the upper boundary of the reordering window are separately increased by 1, and therefore the lower boundary SN of the reordering window changes to 6, and the reordering timer is stopped. That is, the delay cut-off moment of the $4^{th}$ data packet is used as a delivery moment for delivering the $5^{th}$ data packet and a subsequently-received data packet consecutive to the $5^{th}$ data packet.

Optionally, if the delay cut-off moment, of the $4^{th}$ data packet is later than the timeout moment of the reordering timer, the $5^{th}$ data packet and the received data packet consecutive to the $5^{th}$ data packet may be delivered at the timeout moment of the reordering timer. Then, the values of the lower boundary and the upper boundary of the reordering window are separately increased by 1, and therefore the lower boundary SN of the reordering window changes to 6.

It should be understood that, the timeout moment of the reordering timer may be later than the delay cut-off moment corresponding to the $N^{th}$ data packet or the delay cut-off moment of the data packet before the $N^{th}$ data packet in the reordering window. Certainly, the timeout moment of the reordering timer may alternatively be earlier than or equal to the delay cut-off moment corresponding to the $N^{th}$ data packet or the delay cut-off moment of the data packet before the $N^{th}$ data packet in the reordering window. If the timeout moment of the reordering timer is earlier than or equal to the delay cut-off moment corresponding to the $N^{th}$ data packet or the delay cut-off moment of the data packet before the $N^{th}$ data packet in the reordering window, the $N^{th}$ data packet, the data packet stored before the $N^{th}$ data packet, and the data packet consecutive to the $N^{th}$ data packet may alternatively be delivered at the timeout moment of the reordering timer.

In this embodiment of this application, if a delay cut-off moment of a data packet before a data, packet (the $N^{th}$ data packet is used as an example) that triggers the reordering timer to start is later than the timeout moment of the reordering timer, it may be determined, based on a time difference between the delay cut-off moment of the data packet before the $N^{th}$ data packet and the timeout moment of the reordering timer, whether to discard the data packet before the $N^{th}$ data packet at the delay cut-off moment of the data packet before the $N^{th}$ data packet.

For example, it is assumed that N is 4, the value range of the upper boundary SN of the reordering window is from 512 to 1023, and the delay cut-off moment of the data packet before the $N^{th}$ data, packet in the reordering window is earlier than the delay cut-off moment, of the $N^{th}$ data packet. The receiving device has received and delivered a $1^{st}$ data packet and a $2^{nd}$ data packet, and the receiving device has not received a $3^{rd}$ data packet but receives a $4^{th}$ data packet. The $4^{th}$ data packet is in the undelivered state of waiting for the $3^{rd}$ data packet to be received. If a delay cut-off moment of the $3^{rd}$ data packet is later than a timeout moment of the reordering timer, and the $3^{rd}$ data packet has not been received before the reordering timer times out, it is determined, based on a time length (a time difference) between the delay cut-off moment of the $3^{rd}$ data packet and the timeout moment of the reordering timer, whether to discard the $3^{rd}$ data packet and deliver the $4^{th}$ data packet, at the delay cut-off moment of the $3^{rd}$ data packet. For example, if the time length between the delay cut-off moment of the $3^{rd}$ data packet and the timeout moment of the reordering timer is less than or equal to a preset threshold, the $3^{rd}$ data packet is not discarded and the $4^{th}$ data packet is not delivered at the timeout moment of the reordering timer but delivered until the delay cut-off moment of the $3^{rd}$ data packet. If the $3^{rd}$ data packet has been received upon an arrival of the delay cut-off moment of the $3^{rd}$ data packet, the $3^{rd}$ data packet and the $4^{th}$ data packet are jointly delivered. If the $3^{rd}$ data packet has not been received upon the arrival of the delay cut-off moment of the $3^{rd}$ data packet, the $3^{rd}$ data packet is discarded and the $4^{th}$ data packet is delivered. In addition, the values of the lower boundary and the upper boundary of the reordering window are separately increased by 1, and therefore the lower boundary SN of the reordering window changes to 5. The $3^{rd}$ data packet may be received in a period of time for waiting for the delay cut-off moment of the $3^{rd}$ data packet. This prevents the $3^{rd}$ data packet from being discarded too early, thereby improving a receiving probability and a receiving success rate of the $3^{rd}$ data packet. If the time length between the delay cut-off moment of the $3^{rd}$ data packet and the timeout moment of the reordering timer is greater than the preset threshold, the $3^{rd}$ data packet may be discarded and the $4^{th}$ data packet may be delivered at the timeout moment of the reordering timer. In addition, the values of the lower boundary and the upper boundary of the reordering window are separately increased by 1, and therefore the lower boundary SN of the reordering window changes to 5. This prevents the $4^{th}$ data packet from exceeding the delay cut-off moment due to an excessively long waiting time, thereby meeting a delay requirement of the $4^{th}$ data packet. Further, it is assumed that the time length between the delay cut-off moment of the 3rd data packet and the timeout moment of the reordering timer is greater than the preset threshold. Because the timeout moment of the reordering timer arrives first, if the 3rd data packet has been received upon expiry of a preset waiting time starting from the timeout moment of the reordering timer, the $3^{rd}$ data packet and the $4^{th}$ data packet are jointly delivered. If the $3^{rd}$ data packet has not been received upon the expiry of the preset waiting time, the $3^{rd}$ data packet is discarded and the $4^{th}$ data packet is delivered. The $3^{rd}$ data packet may be received within the preset waiting time. This prevents the $3^{rd}$ data packet from being discarded too early, thereby improving a receiving probability and a receiving success rate of the $3^{rd}$ data packet; and further prevents the $4^{th}$ data packet from exceeding the delay cut-off moment due to an excessively long waiting time.

For another example, it is assumed that N is 5, the value range of the upper boundary SN of the reordering window is from 512 to 1023, and the delay cut-off moment of the data packet before the $N^{th}$ data packet in the reordering window is earlier than the delay cut-off moment of the $N^{th}$ data packet. It is assumed that the receiving device has received and delivered a $1^{st}$ data packet and a $2^{nd}$ data packet but has not received a $3^{rd}$ data packet and a $4^{th}$ data packet, and a $5^{th}$ data packet is in a waiting state of waiting for the $3^{rd}$ data packet and the $4^{th}$ data packet to be received. The $5^{th}$ data packet triggers the reordering timer to start. It is assumed that the $3^{rd}$ data packet and the $4^{th}$ data packet have not been received during running of the reordering timer, and a delay cut-off moment of the $3^{rd}$ data packet is later than the timeout moment of the reordering timer. If a time length between the delay cut-off moment of the $3^{rd}$ data packet and the timeout moment of the reordering timer is less than or equal to a preset threshold, the $3^{rd}$ data packet is not discarded at the timeout moment of the reordering timer. If the $3^{rd}$ data packet has not been received until the delay cut-off moment of the $3^{rd}$ data packet, the $3^{rd}$ data packet is discarded. In addition, the values of the lower boundary and the upper boundary of the reordering window are separately increased by 1, and therefore the lower boundary SN of the reordering window changes to 4. At this time, the reordering timer may be restarted. Then, a timeout moment of the reordering timer and a delay cut-off moment of the $4^{th}$ data packet continue to be used for comparison. If the $4^{th}$ data packet has not been received during running of the reordering timer, and the delay cut-off moment of the $4^{th}$ data packet is later than the timeout moment of the reordering timer, when a time length between the delay cut-off moment of the $4^{th}$ data packet and the timeout moment of the reordering timer is less than or equal to a preset threshold, the $4^{th}$ data packet is not discarded at the timeout moment of the reordering timer. Until the delay cut-off moment of the $4^{th}$ data packet, if the $4^{th}$ data packet has been received upon an arrival of the delay cut-off moment of the $4^{th}$ data packet, the $4^{th}$ data packet and the $5^{th}$ data packet are jointly delivered. If the $4^{th}$ data packet has not been received upon the arrival of the delay cut-off moment of the $4^{th}$ data packet, the $4^{th}$ data packet is discarded and the $5^{th}$ data packet is delivered. In addition, the values of the lower boundary and the upper boundary of the reordering window are separately increased by 1, and therefore the lower boundary SN of the reordering window changes to 6. The $4^{th}$ data, packet may be received in a period of time for waiting for the arrival of the delay cut-off moment of the $4^{th}$ data packet. This prevents the $3^{rd}$ data packet and the $4^{th}$ data packet from being discarded too early, thereby improving receiving probabilities and receiving success rates of the $3^{rd}$ data packet and the $4^{th}$ data packet.

Figure 4:
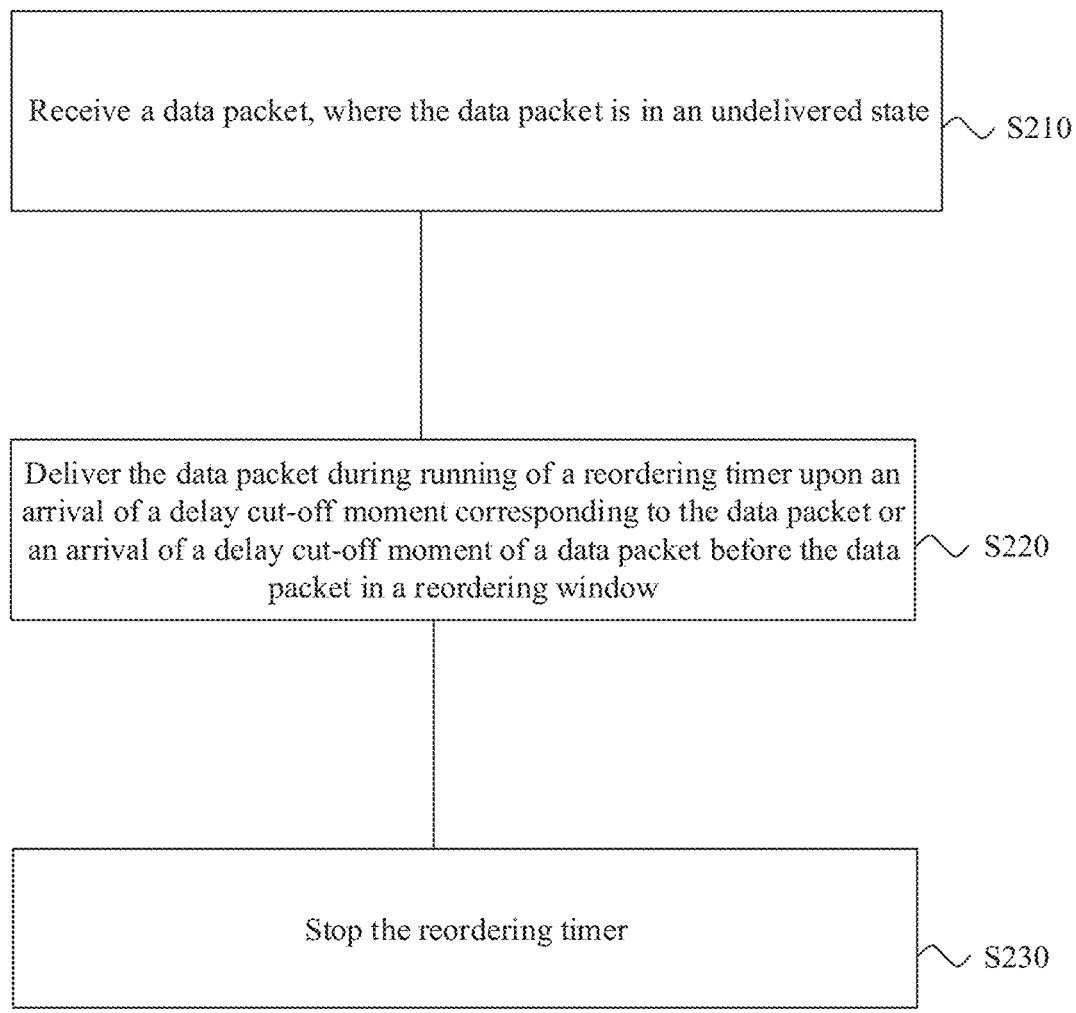
FIG. 4 is a schematic flowchart of another data packet transmission method according to an embodiment of this application.

Optionally, in some possible implementations of this application, FIG. 4 is a schematic flowchart of a data packet transmission method according to some embodiments of this application. Based on the method steps shown in FIG. 3, the method 200 further includes the following steps.

S230. The receiving device stops the reordering timer.

For steps S210 and S220 shown in FIG. 4, refer to the foregoing related descriptions of S210 and S220. For brevity, details are not described herein again.

The $N^{th}$ data packet is delivered to the upper layer upon the arrival of the delay cut-off moment corresponding to the $N^{th}$ data packet or the arrival of the delay cut-off moment of the data packet before the $N^{th}$ data packet reordering window. In addition, if the reordering timer is still running, the reordering timer is stopped (or reset). If a data packet consecutive to the $N^{th}$ data packet is received, the data packet consecutive to the $N^{th}$ data packet may be directly delivered. This avoids impact of the reordering timer on delivery of the data packet consecutive to the $N^{th}$ data packet, and meets a delay requirement of the data packet consecutive to the $N^{th}$ data packet. If a disordered data packet is received again, the reordering timer is restarted. In addition, the data packet is delivered upon the arrival of the delay cut-off moment corresponding to the data packet or the arrival of the delay cut-off moment of the data packet before the data, packet in the reordering window.

In the data packet transmission method provided in this application, when a data packet is in the undelivered state due to a limitation of the reordering timer during waiting for a disordered data packet to be received, even if the reordering timer is in the running state (not timed out), the data packet can be delivered upon an arrival of a delay cut-off moment corresponding to the $N^{th}$ data packet or at a delay cut-off moment of a data packet before the $N^{th}$ data packet in the reordering window, and the reordering timer can be stopped or reset. Delivery of each data packet is no longer limited by the reordering timer. In this way, a problem of data packet delivery timeout that may be caused by the limitation of the reordering timer is resolved, thereby meeting a data packet delay requirement.

Optionally, in some possible implementations of this application, in the foregoing step S220, in addition to the $N^{th}$ data packet, the receiving device further delivers a received data packet before the $N^{th}$ data packet in the reordering window, and delivers a data packet that has been stored in the reordering window, that is after the $N^{th}$ data packet, and that has a sequence number consecutive to a sequence number N of the $N^{th}$ data packet.

Specifically, upon the arrival of the delay cut-off moment corresponding to the $N^{th}$ data packet or the arrival of the delay cut-off moment of the data packet before the $N^{th}$ data packet in the reordering window, at the delay cut-off moment of the $N^{th}$ data packet, in addition to the $N^{th}$ data packet, the receiving device may further deliver a data packet that has been received (that has been stored in the reordering window) before the $N^{th}$ data packet (regardless of whether the data packet before the $N^{th}$ data packet is consecutive to the $N^{th}$ data packet) and a data packet that has been received (or that has been stored in the reordering window) after the $N^{th}$ data packet and that is consecutive to the $N^{th}$ data packet. Herein, a data packet before the $N^{th}$ data packet in the reordering window may be understood as a data packet that is closer to the lower boundary of the reordering window in time domain than the $N^{th}$ data packet; and a data packet after the $N^{th}$ data packet in the reordering window may be understood as a data packet that is closer to the upper boundary of the reordering window in time domain than the $N^{th}$ data packet.

It should be understood that, it is assumed that a delay cut-off moment of a specific data packet before the data packet is earlier than the delay cut-off moment of the data packet. Upon the arrival of the delay cut-off moment of the data packet, if the data packet has been received, the data packet and a data packet that has been stored before the data packet are delivered, and a data packet that is after and consecutive to the data packet is delivered; and if the data packet has not been received, the data, packet is discarded, and the data packet that has been stored before the data packet and the data packet that is after and consecutive to the data packet are delivered. In the foregoing two cases, regardless of whether the data packet that has been stored before the data packet is consecutive to the data packet, the data packet that has been stored before the data packet is always delivered. In addition, a data packet that is before the data, packet and that has not been received is discarded.

Descriptions are provided by using examples below with reference to FIG. 5.

Figure 5:
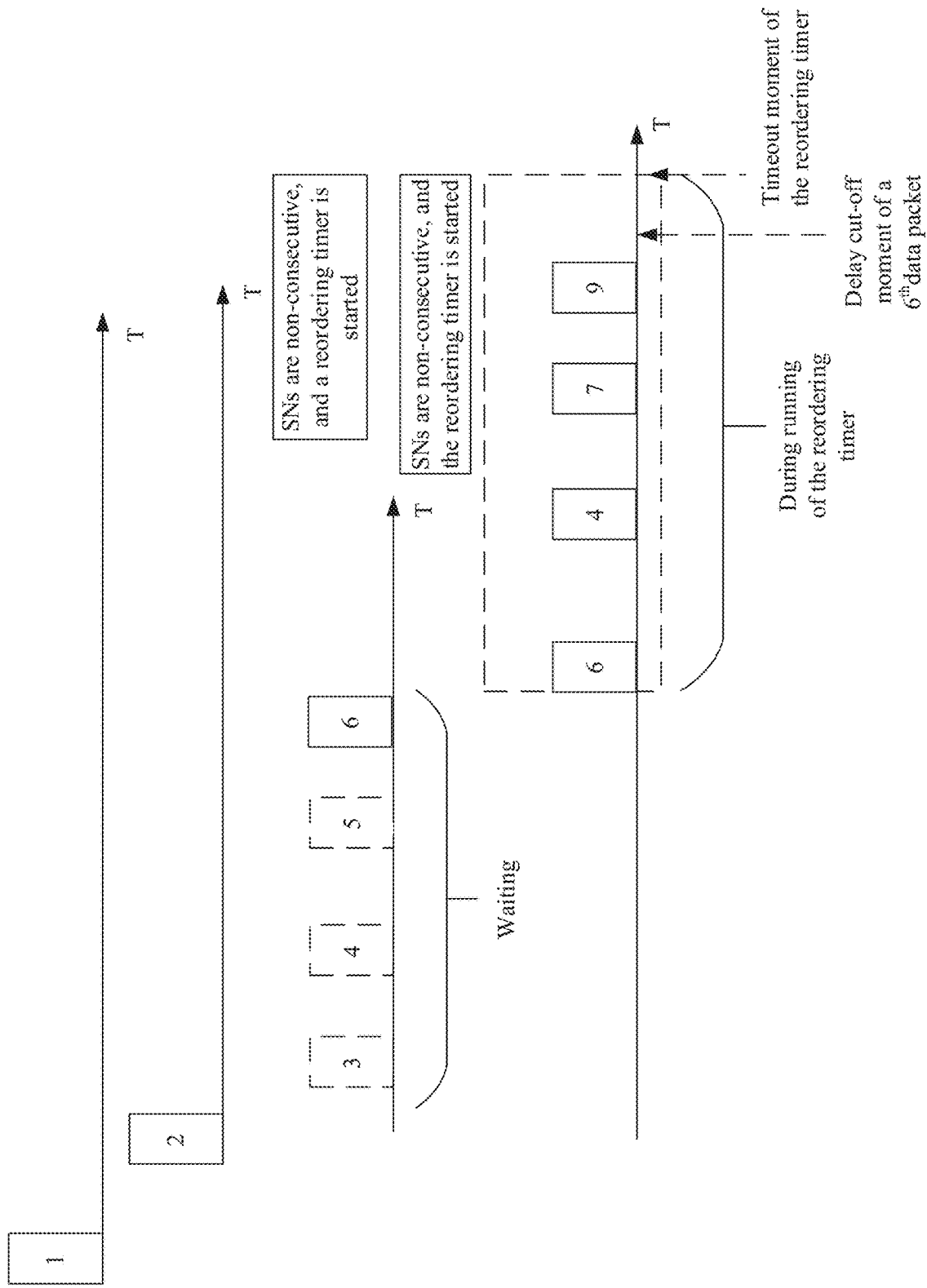
FIG. 5 is a schematic diagram of an example of delivering a received data packet before an $N^{th}$ data packet in a reordering window and a data packet that has been stored in the reordering window and that has a sequence number consecutive to a sequence number N of the $N^{th}$ data packet according to an embodiment of this application.

As shown in FIG. 5, it is assumed that the value range of the upper boundary SN of the reordering window is from 512 to 1023, and the delay cut-off moment of the data packet before the $N^{th}$ data packet in the reordering window is earlier than the delay cut-off moment of the $N^{th}$ data packet. It is assumed that N is 6, and the receiving device has received and delivered a $1^{st}$ data packet and a $2^{nd}$ data packet, and then receives a $6^{th}$ data packet. Due to a disorder, the reordering timer needs to be started at this time. The $6^{th}$ data packet is not delivered immediately, but waits for a $3^{rd}$ data packet, a $4^{th}$ data packet, and a $5^{th}$ data packet to be received. The $6^{th}$ data packet is a data packet already stored in the reordering window. A delay cut-off moment of the $6^{th}$ data packet is earlier than a timeout moment of the reordering timer. Before the delay cut-off moment of the $6^{th}$ data packet arrives, the receiving device further receives the $4^{th}$ data packet, a $7^{th}$ data packet, and a $9^{th}$ data packet. After the $9^{th}$ data packet is received, the delay cut-off moment of the $6^{th}$ data packet arrives. When the delay cut-off moment of the $6^{th}$ data packet arrives, the $4^{th}$ data packet, the $7^{th}$ data packet, and the $9^{th}$ data packet are also data packets already stored in the reordering window. In this case, even if the reordering timer does not time out, the receiving device still delivers the $4^{th}$ data packet, the $6^{th}$ data packet, and the $7^{th}$ data packet, and stops or resets the reordering timer. Herein, the $4^{th}$ data packet is a received data packet before the $6^{th}$ data packet, even if the $4^{th}$ data packet is not consecutive to the $6^{th}$ data packet. That is, the $6^{th}$ data packet and a data packet stored before the $6^{th}$ data packet are delivered (regardless of whether the data packet is consecutive to the $6^{th}$ data packet). The $7^{th}$ data packet and the $9^{th}$ data packet are received data packets after the $N^{th}$ data packet. The $7^{th}$ data packet is consecutive to the $6^{th}$ data packet. However, because the $9^{th}$ data packet is not consecutive to the $7^{th}$ data packet, the $9^{th}$ data packet is not delivered. That is, at the delay cut-off moment of the $6^{th}$ data packet, the received data packet before the $6^{th}$ data packet and a data packet that has been stored in the reordering window, that is after the $6^{th}$ data packet, and that has a sequence number consecutive to a sequence number N of the $6^{th}$ data packet are delivered.

It should be understood that, the foregoing several manners are merely several examples of a moment for delivering the $N^{th}$ data packet. In this embodiment of this application, a delay cut-off moment for delivering the $N^{th}$ data packet may alternatively be another moment, provided that the moment is earlier than the delay cut-off moment corresponding to the $N^{th}$ data packet and later than a moment at which the $N^{th}$ data packet is received. This application sets no limitation herein.

Optionally, in some possible implementations of this application, after delivering the data packet, the receiving device may use 1 plus a maximum sequence number of a delivered data packet as the value of the lower boundary of the reordering window. Alternatively, 1 plus a sequence number of a data packet whose delay cut-off moment arrives is used as the value of the lower boundary of the reordering window.

Specifically, the receiving device may use 1 plus the maximum sequence number of the delivered data packet as the value of the lower boundary of the reordering window (a sequence number of a next data packet expected to be received), or use 1 plus the sequence number of the data packet whose delay cut-off moment arrives as the value of the lower boundary of the reordering window (the sequence number of the next data packet expected to be received). The delivered data packet includes: a received (or stored) data packet before the $N^{th}$ data packet, and a received data packet that is after and consecutive to the $N^{th}$ data packet. The data packet whose delay cut-off moment arrives (times out) may be a data packet before the $N^{th}$ data packet. An SN of the next data packet expected to be received may be represented by "Next_PDCP_RX_SN", With reference to the example shown in FIG. 5, the delivered data packet includes the $4^{th}$ data packet, the $6^{th}$ data packet, and the $7^{th}$ data packet, and therefore "Next_PDCP_RX_SN" is set to 8, indicating that a next data packet expected to be received is an $8^{th}$ data packet. In addition, the lower boundary SN of the reordering window changes to 8, and the upper boundary SN of the reordering window changes to 518. It should be understood that, because the SNs are cyclic and the value range of the SNs is 0 to 1023, when the upper boundary SN or the lower boundary SN of the reordering window is 1023, the value of the upper boundary or the value of the lower boundary of the reordering window is 0 after being increased by 1, which indicates a $1^{st}$ data packet in a next SN period.

For example, in the example shown in FIG. 5, because the $9^{th}$ data packet has been received, before a delay cut-off moment of the $9^{th}$ data packet arrives, if the $8^{th}$ data packet is also received, the $8^{th}$ data packet and the $9^{th}$ data packet may be jointly delivered, and a value of "Next_PDCP_RX_SN" may be set to 10. In addition, the lower boundary SN of the reordering window changes to 10, and the upper boundary SN of the reordering window changes to 520. If the $8^{th}$ data packet has not been received before the delay cut-off moment of the $9^{th}$ data packet, the $9^{th}$ data packet is delivered, and the value of "Next_PDCP_RX_SN" is also set to 10. In addition, the lower boundary SN of the reordering window changes to 10, and the upper boundary SN of the reordering window changes to 520.

In this embodiment of this application, the receiving device may determine a delay cut-off moment of each data packet in the following two manners. An example of determining the delay cut-off moment of the $N^{th}$ data packet is used for description.

Manner 1: The $N^{th}$ data packet carries a sending moment of the $N^{th}$ data packet, and the receiving device determines the delay cut-off moment corresponding to the $N^{th}$ data packet based on the sending moment of the $N^{th}$ data packet and a transmission delay budget.

Specifically, the transmission delay budget may be predefined or sent by the sending device to the receiving device. It is assumed that all data packets carried by one DRB have a same delay budget. The $N^{th}$ data packet has a same transmission delay budget as an $(N+M)^{th}$ data packet or an $(N-M)^{th}$ data packet. In addition, the $N^{th}$ data packet carries the sending moment of the $N^{th}$ data packet, and the sending moment of the $N^{th}$ data packet may be understood as a moment at which the $N^{th}$ data packet arrives at the entry of the PDCP layer of the sending device. After receiving the $N^{th}$ data packet, the receiving device may determine the delay cut-off moment of the $N^{th}$ data packet based on the sending moment of the $N^{th}$ data packet and the transmission delay budget. It is assumed that, the sending moment of the $N^{th}$ data packet is a moment T1, and the transmission delay budget is represented by using T2. In this case, the delay cut-off moment of the $N^{th}$ data packet is T1+T2. Similarly, a delay cut-off moment of another data packet may also be determined in this manner. Optionally, the sending device may notify the receiving device of the sending moment of the $N^{th}$ data packet by using other signaling.

Manner 2: The delay cut-off moment corresponding to the $N^{th}$ data packet is determined based on a delay cut-off moment corresponding to a $1^{st}$ data packet and a data packet, period.

Specifically, if the data packets are sent periodically, because each data packet corresponds to the same delay requirement, delay cut-off moments of the periodically sent data packets are also periodic. For example, a data packet sending period of the sending device is 1 ms, and the transmission delay budget is 5 ms. A sending moment of a $1^{st}$ data packet is T0, and a delay cut-off moment of the $1^{st}$ data packet is T0+5 ms. A sending moment of a $2^{nd}$ data packet, is T0+1 ms, and a delay cut-off moment of the $2^{nd}$ data packet is T0+6 ms. A sending moment of a $3^{rd}$ data packet is T0+2 ms, and a delay cut-off moment of the $3^{rd}$ data packet is T0+7 ms. It can be learned that, the delay cut-off moments of the data packets are also periodic. Therefore, the delay cut-off moment corresponding to the $N^{th}$ data packet may be determined by using the delay cut-off moment corresponding to the $1^{st}$ data packet and the data packet period. For example, if the delay cut-off moment corresponding to the $1^{st}$ data packet is Td, and the data packet period is S, the delay cut-off moment corresponding to the $N^{th}$ data packet is Td+(N−1)S. Similarly, a delay cut-off moment of another data packet may also be determined in this manner. The delay cut-off moment corresponding to the $1^{st}$ data packet may be carried in the $1^{st}$ data packet, or the sending device may notify the receiving device of the delay cut-off moment corresponding to the $1^{st}$ data packet by using other signaling.

It should be understood that, in this embodiment of this application, the delay cut-off moment of each data packet may be determined in another manner in addition to the foregoing two manners. For example, the sending device may notify the receiving device of the delay cut-off moment of each data packet in advance. This is not limited herein in this application.

Optionally, in some possible implementations of this application, a delivery time of a data packet may be maintained in a timer manner or a duration manner.

For example, a maximum delay timer may be maintained for each received data packet. The $N^{th}$ data packet is used as an example. A start moment of a maximum delay timer corresponding to the $N^{th}$ data packet is the sending moment of the $N^{th}$ data packet, and a timeout moment of the maximum delay timer corresponding to the $N^{th}$ data packet is the delay cut-off moment corresponding to the $N^{th}$ data packet or the delay cut-off moment corresponding to the data packet before the $N^{th}$ data packet in the reordering window. When the maximum delay timer times out, the $N^{th}$ data packet, the received data packet before the $N^{th}$ data packet, and the received data packet that is after and consecutive to the $N^{th}$ data packet are delivered. Similarly, a maximum delay timer may also be maintained separately for another data packet. The data packet and a data packet consecutive to the data packet are delivered at a timeout moment of the maximum delay timer. Optionally, when a delivery time of the $N^{th}$ data packet is maintained by using the maximum delay timer, for example, for the $N^{th}$ data packet, the sending device may notify the receiving device of the sending moment of the $N^{th}$ data packet before sending the $N^{th}$ data packet. After obtaining the sending moment of the $N^{th}$ data packet, the receiving device may learn a moment at which the maximum delay timer is started. In addition, the timeout moment of the maximum delay timer corresponding to the $N^{th}$ data packet may be determined based on the transmission delay budget and the like. A duration of the maximum delay timer is equal to or less than the transmission delay budget. Alternatively, the sending device may directly notify the receiving device of the timeout moment of the maximum delay timer corresponding to the $N^{th}$ data packet.

For another example, a duration may be maintained for each received data packet. The duration herein is used to determine a latest delivery time (a delay cut-off moment) of the received data packet. The $N^{th}$ data packet is used as an example. The receiving device may maintain a duration for the $N^{th}$ data packet, and the duration may be understood as a time period. For example, the time period may be a time length between the sending moment and the delay cut-off moment of the $N^{th}$ data packet. When the duration expires (an end moment of the duration arrives), the $N^{th}$ data packet, the received data packet before the $N^{th}$ data packet, the received data packet that is after and consecutive to the $N^{th}$ data packet are delivered. Alternatively, the duration may be understood as a time point. For example, the time point may be the delay cut-off moment of the $N^{th}$ data packet or the delay cut-off moment of the data packet before the $N^{th}$ data packet. When the duration expires, the $N^{th}$ data packet, the received data packet before the $N^{th}$ data packet, the received data packet that is after and consecutive to the $N^{th}$ data packet are delivered. Similarly, a duration may be separately maintained for another data packet. When the duration expires, the data packet and a data packet consecutive to the data packet are delivered.

It should be understood that, in this embodiment of this application, in addition to maintaining a delay cut-off moment (a latest delivery time) of a data packet in the timer manner and the duration manner, the delay cut-off moment of the data packet, may be determined in another manner.

The $N^{th}$ data packet, the received data packet before the $N^{th}$ data packet, and the received data packet that is after and consecutive to the $N^{th}$ data packet are delivered at a first moment. This is not limited herein in this embodiment of this application.

It should be understood that in the embodiments of this application, "first", "second", and the like are merely for ease of description. For example, a $1^{st}$ data packet and a $2^{nd}$ data packet are merely used to represent different data packets. The "first", the "second", and the like should not be construed as any limitation on the embodiments of this application.

It should be further understood that, the foregoing descriptions are merely intended to help a person skilled in the art better understand the embodiments of this application, instead of limiting the scope of the embodiments of this application. It is clear that a person skilled in the art may make various equivalent modifications or changes based on the foregoing examples. For example, some steps in the embodiments of the foregoing method may not be required, or some steps may be added. Alternatively, any two or more of the foregoing embodiments are combined. A modified, changed, or combined solution also fails within the scope of the embodiments of this application.

It should be further understood that the foregoing descriptions of the embodiments of this application emphasize differences between the embodiments. For same or similar parts that are not mentioned, refer to the embodiments. For brevity, details are not described herein again.

It should be further understood that sequence numbers of the processes do not mean execution sequences. The execution sequences of the processes should be determined based on functions and internal logic of the processes, and should not be construed as any limitation on the implementation processes of the embodiments of this application.

It should be further understood that in the embodiments of this application, "presetting" and "predefinition" may be implemented by pre-storing, in a device (including, for example, a terminal and a network device), corresponding code, a corresponding table, or in another manner that can be used to indicate related information. A specific implementation is not limited in this application.

It should be further understood that the division of the manners, cases, categories, and embodiments in the embodiments of this application is merely for ease of description, and should not constitute a particular limitation. The features in the manners, categories, cases, and embodiments may be combined without contradiction.

It should be further understood that, in the embodiments of this application, if there is no particular description or logical collision, terms and/or descriptions in different embodiments are consistent and may be mutually referenced. Technical features in different embodiments may be combined based on an internal logical relationship to form a new embodiment.

The foregoing describes in detail the data packet transmission method in the embodiments of this application with reference to FIG. 1 to FIG. 5. The following describes in detail the communications apparatuses in the embodiments of this application with reference to FIG. 6 to FIG. 9.

Figure 6:
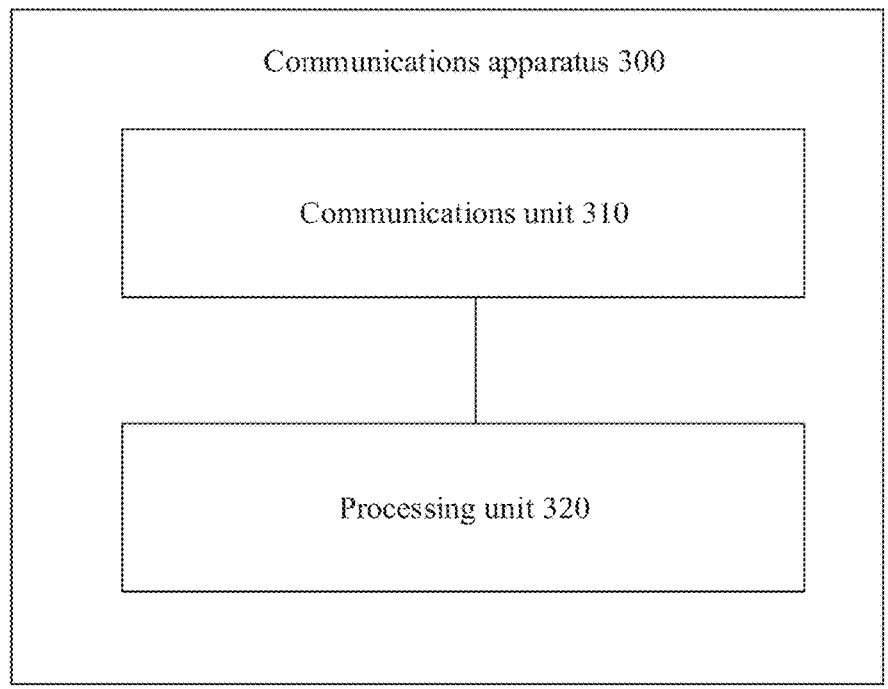
FIG. 6 is a schematic diagram of a structure of another communications apparatus according to an embodiment of this application.

FIG. 6 is a schematic block diagram of a communications apparatus 300 according to an embodiment of this application. The apparatus 300 may correspond to the receiving device described in the method 200, or may be a chip or a component used in the receiving device. Modules or units in the apparatus 300 are configured to perform actions or processing processes performed by the receiving device in the foregoing method 200. As shown in FIG. 6, the communications apparatus 300 may include a communications unit 310 and a processing unit 320.

The communications unit 310 is configured to receive a data packet, where the data packet is in an undelivered state.

The processing unit 320 is configured to deliver the data packet during running of a reordering timer upon an arrival of a delay cut-off moment corresponding to the data packet or an arrival of a delay cut-off moment of a data packet before the data packet in a reordering window.

According to the communications apparatus provided in this application, when a data packet is in the undelivered state due to a limitation of the reordering timer during waiting for a disordered data packet to be received, even if the reordering timer is in the running state (not timed out), the communications apparatus can deliver the data packet upon an arrival of a delay cut-off moment corresponding to the data packet or an arrival of a delay cut-off moment of a data packet before the data packet in the reordering window. Delivery of each data packet is no longer limited by the reordering timer. In this way, a problem of data packet delivery timeout that may be caused by the limitation of the reordering timer is resolved, thereby meeting a data packet delay requirement and improving data packet transmission efficiency.

Optionally, in some possible implementations of this application, the processing unit 320 is further configured to stop the reordering timer, where the reordering timer is triggered to start by the data packet or by the data packet received before the data packet, and the delay cut-off moment corresponding to the data packet or the delay cut-off moment of the data packet before the data packet in the reordering window is earlier than a timeout moment of the reordering timer.

Optionally, in some possible implementations of this application, the delay cut-off moment of the data packet before the data packet in the reordering window is a delay cut-off moment corresponding to a first unreceived data packet counted forward from the data packet in the reordering window.

Optionally, in some possible implementations of this application, the delay cut-off moment of the data packet before the data packet in the reordering window is a delay cut-off moment corresponding to a data packet with an earliest delay cut-off moment in a data packet that is before the data packet in the reordering window and whose delay cut-off moment does not time out.

Optionally, in some possible implementations of this application, the processing unit 320 is further configured to deliver a data packet that has been stored in the reordering window and that is before the data packet, and deliver a data packet that has been stored in the reordering window, that is after the data packet, and that has a sequence number consecutive to that of the data packet.

Optionally, in some possible implementations of this application, the data packet carries a sending moment of the data packet, and the processing unit 320 is further configured to determine the delay cut-off moment corresponding to the data packet based on the sending moment of the data packet and a transmission delay budget.

Optionally, in some possible implementations of this application, the processing unit 320 is further configured to determine the delay cut-off moment, corresponding to the data packet based on a delay cut-off moment corresponding to a $1^{st}$ data packet and a data packet period, where the sequence number of the data packet is greater than or equal to 1.

Optionally, in some possible implementations of this application, the processing unit 320 is further configured to use 1 plus a maximum sequence number of a delivered data packet, as a value of a lower boundary of the reordering window, or use 1 plus a sequence number of a data packet whose delay cut-off moment arrives as the value of the lower boundary of the reordering window.

Optionally, in some possible implementations of this application, the delay cut-off moment corresponding to the data packet is a timeout moment of a maximum delay timer corresponding to the data packet, or the delay cut-off moment corresponding to the data packet is a cut-off moment of a duration corresponding to the data packet.

The processing unit 320 is further configured to deliver the data packet at the timeout moment of the maximum delay timer, or deliver the data packet at the cut-off moment of the duration.

It should be understood that, for specific processes in which the units in the apparatus 300 perform the foregoing corresponding steps, refer to the foregoing descriptions related to the receiving device with reference to the embodiments shown in FIG. 3 to FIG. 5 and the related embodiments of the method 200. For brevity, details are not described herein again.

Optionally, the communications unit 310 may include a receiving unit (module) and a sending unit (module), configured to perform the steps of receiving information and sending information by the receiving device in the embodiments of the method 200 and the embodiments shown in FIG. 3 to FIG. 5. Optionally, the communications apparatus 300 may further include a storage unit 330, configured to store instructions executed by the processing unit 320 and the communications unit 320. The processing unit 320, the communications unit 310, and the storage unit 330 are in communication connection. The storage unit 330 stores the instructions. The processing unit 320 is configured to execute the instructions stored in the storage unit 330. The communications unit 310 is configured to send or receive a specific signal under driving of the processing unit 320.

It should be understood that the communications unit 310 may be a transceiver, an input/output interface, or an interface circuit. The storage unit 330 may be a memory. The processing unit 320 may be implemented by a processor.

It should be further understood that, the communications apparatus 300 shown in FIG. 6 may be a network device or a terminal, or may be a chip in the network device or the terminal.

It should be understood that division of the foregoing apparatus into units is merely division into logical functions. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using a hardware integrated logic circuit of the processing element, or may be implemented in a form of software invoked by the processing element.

For example, a unit in any one of the foregoing apparatuses may be one or more integrated circuits configured to implement the foregoing method, for example, one or more application-specific integrated circuits (ASICs), one or more digital signal processors (DSPs), one or more field programmable gate arrays (FPGAs), or a combination of at least two of the integrated circuits. For another example, when a unit in the apparatus is implemented in a form of a program invoked by the processing element, the processing element may be a general-purpose processor, for example, a central processing unit (CPU), or another processor that can invoke the program. For still another example, the units may be integrated and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 7:
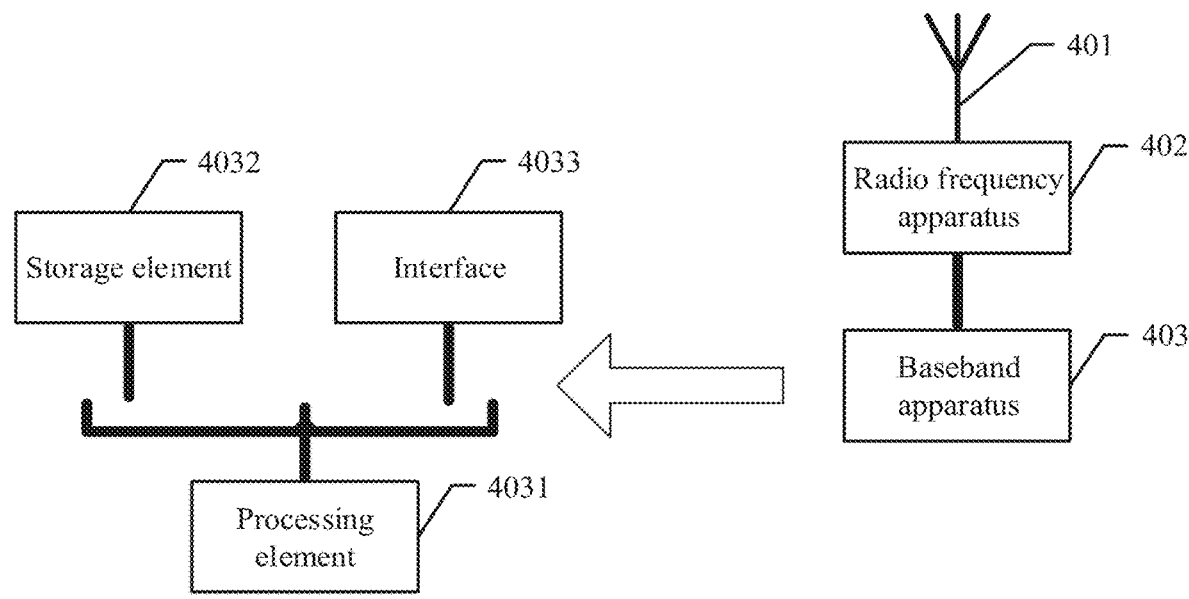
FIG. 7 is a schematic diagram of a structure of network device according to an embodiment of this application.

FIG. 7 is a schematic diagram of a structure of a network device according to an embodiment of this application. The network device is configured to implement operations of the receiving device in the foregoing embodiments. As shown in FIG. 7, the network device includes an antenna 401, a radio frequency apparatus 402, and a baseband apparatus 403. The antenna 401 is connected to the radio frequency apparatus 402. In an uplink direction, the radio frequency apparatus 402 receives, through the antenna 401, information sent by a terminal, and sends, to the baseband apparatus 403 for processing, the information sent by the terminal. In a downlink direction, the baseband apparatus 403 processes the information from the terminal, and sends the information to the radio frequency apparatus 402. The radio frequency apparatus 402 processes the information from the terminal, and then sends processed information to the terminal through the antenna 401.

The baseband apparatus 403 may include one or more processing elements 4031, for example, include one main control CPU and another integrated circuit. In addition, the baseband apparatus 403 may further include a storage element 4032 and an interface 4033. The storage element 4032 is configured to store a program and data. The interface 4033 is configured to exchange information with the radio frequency apparatus 402, and the interface is, for example, a common public radio interface (CPRI). The foregoing apparatus used for the network device may be located in the baseband apparatus 403. For example, the foregoing apparatus used for the network device may be a chip on the baseband apparatus 403. The chip includes at least one processing element and interface circuit. The processing element is configured to perform the steps of any one of the methods performed by the network device. The interface circuit is configured to communicate with another apparatus. In an implementation, units of the network device that implement, the steps in the foregoing methods may be implemented by a program invoked by a processing element. For example, the apparatus used for the network device includes a processing element and a storage element. The processing element invokes a program stored in the storage element, to perform the methods performed by the network device in the foregoing method embodiments. The storage element may be a storage element located on a same chip as the processing element, that is, an on-chip storage element, or may be a storage element located on a different chip from the processing element, that is, an off-chip storage element.

In another implementation, units of the network device that implement the steps in the foregoing methods may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the network device that implement the steps in the foregoing methods may be integrated together, and implemented in a form of a system-on-a-chip (SOC). For example, the baseband apparatus includes the SOC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by a program invoked by the processing element, and functions of some units may be implemented by the integrated circuit.

It can be learned that the foregoing apparatus used for the network device may include at least one processing element and interface circuit. The at least one processing element is configured to perform any one of the methods that are provided in the foregoing method embodiments and performed by the network device. The processing element may perform some or all steps performed by the network device, in a first manner, to be specific, by invoking the program stored in the storage element; or may perform some or all steps performed by the network device, in a second manner, to be specific, by using a hardware integrated logic circuit in the processing element in combination with instructions; or may certainly perform, by combining the first manner and the second manner, some or all steps performed by the network device.

As described above, the processing element herein may be a general-purpose processor, for example, a CPU, or may be one or more integrated circuits configured to implement the foregoing methods, for example, one or more ASICs, one or more digital signal processors DSPs, one or more FPGAs, or a combination of at least two of the integrated circuits.

The storage element may be one memory, or may be a general term of a plurality of storage elements.

Figure 8:
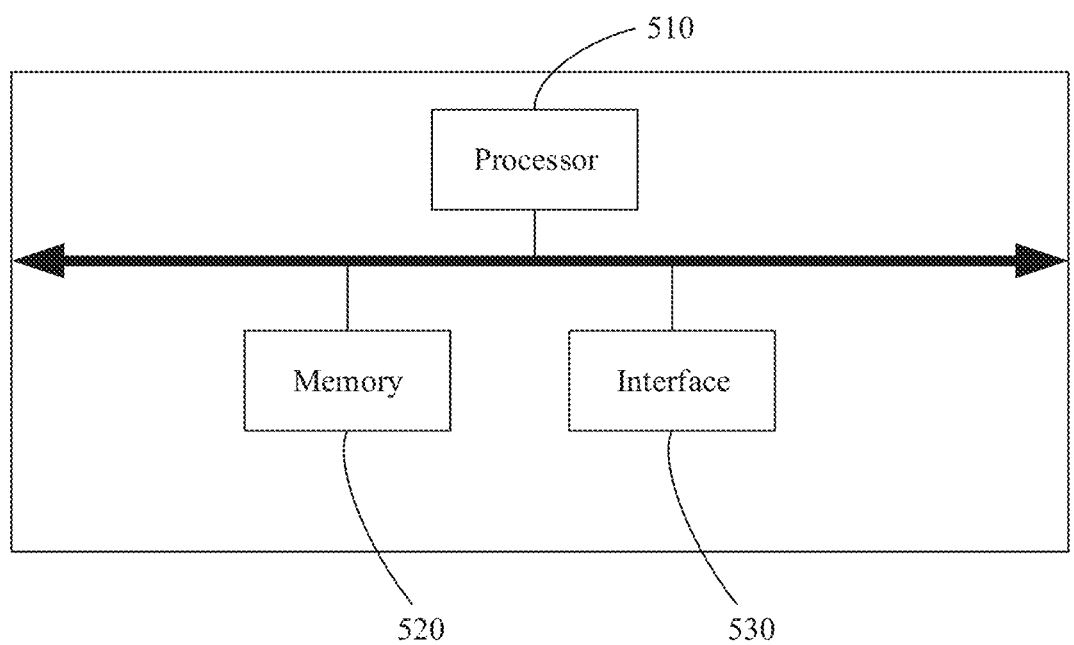
FIG. 8 is another schematic diagram of a structure of a network device according to an embodiment of this application.

FIG. 8 is another schematic diagram of a structure of a network device according to an embodiment, of this application. The network device may be the receiving device in the foregoing embodiments and is configured to implement operations of the receiving device in the foregoing embodiments.

As shown in FIG. 8, the network device includes a processor 510, a memory 520, and an interface 530. The processor 510, the memory 520, and the interface 530 are connected to each other.

The foregoing apparatus 300 may be located in the network device, and functions of the units may be implemented by the processor 510 by invoking a program stored in the memory 520. That is, the foregoing apparatus includes a memory and a processor. The memory is configured to store a program, and the program is invoked by the processor to perform the methods in the foregoing method embodiments. The processor herein may be an integrated circuit having a signal processing capability, for example, a CPU. Alternatively, functions of the foregoing units may be implemented by one or more integrated circuits configured to implement the foregoing methods, for example, one or more ASICs, one or more digital signal processors DSPs, one or more FPGAs, or a combination of at least two of the integrated circuits. Alternatively, the foregoing implementations may be combined.

Figure 9:
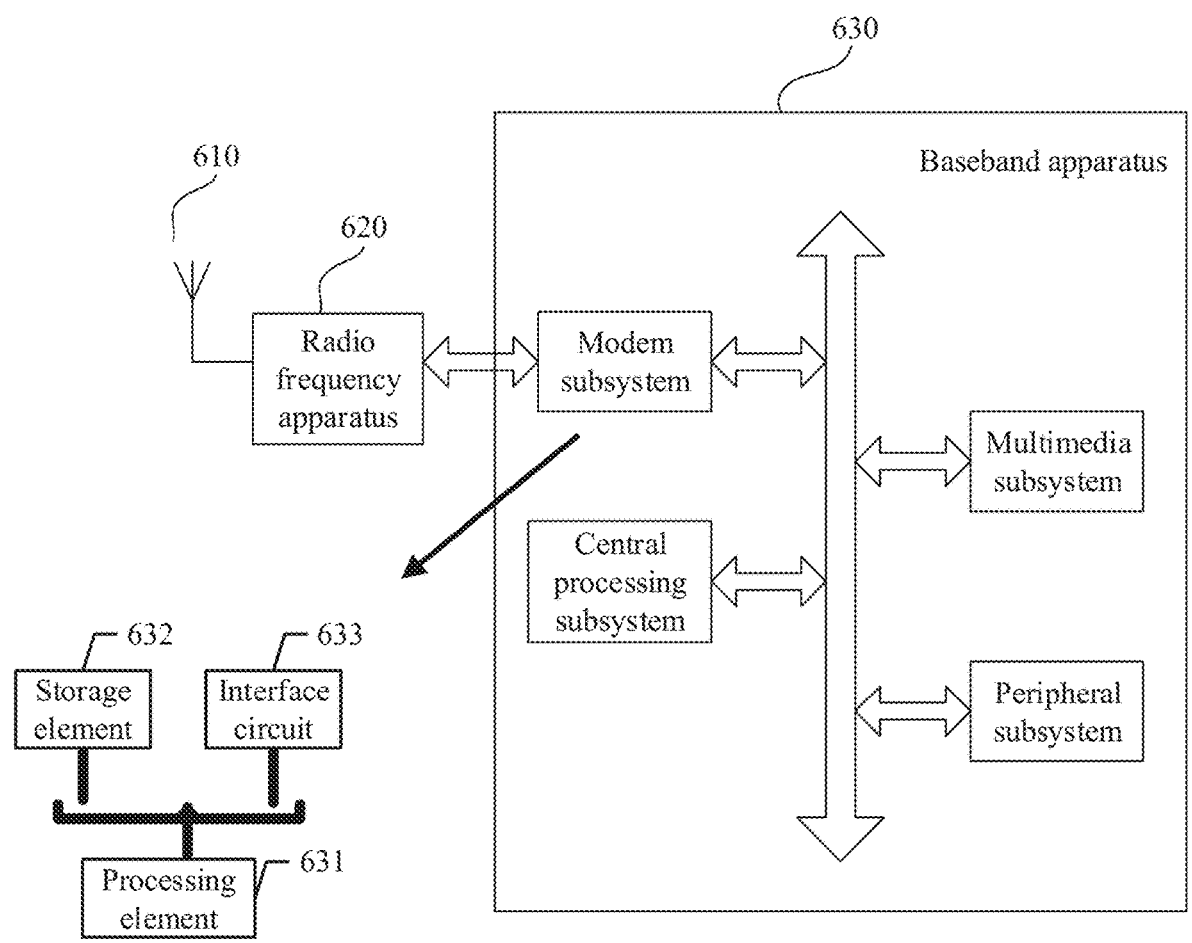
FIG. 9 is a schematic diagram of a structure of a terminal according to an embodiment of this application.

FIG. 9 is a schematic diagram of a structure of a terminal according to an embodiment of this application. The terminal may be the receiving device in the foregoing embodiments and is configured to implement operations of the receiving device in the foregoing embodiments. As shown in FIG. 9, the terminal includes an antenna 610, a radio frequency part 620, and a signal processing part 630. The antenna 610 is connected to the radio frequency part 620. In a downlink direction, the radio frequency part 620 receives, through the antenna 610, information sent by a network device, and sends, to the signal processing part 630 for processing, the information sent by the network device. In an uplink direction, the signal processing part 630 processes the information from the terminal, and sends the information to the radio frequency part 620. The radio frequency part 620 processes the information from the terminal, and then sends processed information to the network device through the antenna 610.

The signal processing part 630 may include a modem subsystem, configured to process data at each communications protocol layer. The signal processing part 630 may further include a central processing subsystem, configured to implement, processing of an operating system and an application layer of the terminal. In addition, the signal processing part 630 may further include another subsystem, for example, a multimedia subsystem or a peripheral subsystem. The multimedia, subsystem is configured to control a camera or a screen display of the terminal, and the peripheral subsystem is configured to implement a connection to another device. The modem subsystem may be a separately disposed chip. Optionally, the foregoing apparatus used for the terminal may be located in the modem subsystem.

The modem subsystem may include one or more processing elements 631, for example, include one main control CPU and another integrated circuit. In addition, the modem subsystem may further include a storage element 632 and an interface circuit 633. The storage element 632 is configured to store data and a program. However, a program used to perform the methods performed by the terminal in the foregoing methods may not be stored in the storage element 632, but is stored in a memory outside the modem subsystem, and is loaded and used by the modem subsystem when to be used. The interface circuit 333 is configured to communicate with another subsystem. The foregoing apparatus used for the terminal may be located in the modem subsystem. The modem subsystem may be implemented by using a chip. The chip includes at least one processing element and interface circuit. The processing element is configured to perform the steps of any method performed by the terminal. The interface circuit is configured to communicate with another apparatus. In an implementation, units of the terminal that implement the steps in the foregoing methods may be implemented by a program scheduled by the processing element. For example, the apparatus used for the terminal includes a processing element and a storage element. The processing element invokes a program stored in the storage element, to perform the methods performed by the terminal in the foregoing method embodiments. The storage element may be a storage element located on a same chip as the processing element, that is, an on-chip storage element.

In another implementation, the program used to perform the methods performed by the terminal in the foregoing methods may be in a storage element located on a different chip from the processing element, that is, an off-chip storage element. In this case, the processing element, invokes or loads the program from the off-chip storage element to the on-chip storage element, to invoke and perform the methods performed by the terminal in the foregoing method embodiments.

In still another implementation, units of the terminal that implement the steps in the foregoing methods may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

Units of the terminal that implement the steps in the foregoing methods may be integrated together, and implemented in a form of a system-on-a-chip (SOC). The SOC chip is configured to implement the foregoing methods. At least one processing element and storage element may be integrated into the chip, and the processing element invokes a program stored in the storage element to implement the foregoing methods performed by the terminal. Alternatively, at least one integrated circuit may be integrated into the chip, to implement the foregoing methods performed by the terminal. Alternatively, with reference to the foregoing implementations, functions of some units may be implemented by a program invoked by the processing element, and functions of some units may be implemented by the integrated circuit.

It can be learned that the foregoing apparatus used for the terminal may include at least one processing element, and interface circuit. The at least one processing element is configured to perform any one of the methods that are provided in the foregoing method embodiments and performed by the terminal. The processing element may perform some or all steps performed by the terminal, in a first manner, to be specific, by invoking the program stored in the storage element; or may perform some or all steps performed by the terminal, in a second manner, to be specific, by using a hardware integrated logic circuit, in the processing element in combination with instructions; or may certainly perform, by combining the first manner and the second manner, some or all steps performed by the terminal.

As described above, the processing element herein may be a general-purpose processor, for example, a CPU, or may be one or more integrated circuits configured to implement the foregoing methods, for example, one or more ASICs, one or more digital signal processors DSPs, one or more FPGAs, or a combination of at least two of the integrated circuits.

The storage element may be one memory, or may be a general term of a plurality of storage elements.

An embodiment of this application further provides a communications system. The communications system includes the foregoing terminal and the foregoing network device.

An embodiment of this application further provides a computer-readable medium, configured to store computer program code. The computer program includes instructions used to perform the data packet transmission method in the embodiments of this application in the method 200. The readable medium may be a read-only memory (ROM) or a random access memory (RAM). This is not limited in the embodiments of this application.

This application further provides a computer program product. The computer program product includes instructions. When the instructions are executed, the terminal and the network device are enabled to perform operations corresponding to the receiving device in the foregoing methods.

An embodiment of this application further provides a system chip. The system chip includes a processing unit and a communications unit. For example, the processing unit may be a processor, and the communications unit may be an input/output interface, a pin, or a circuit. The processing unit may execute computer instructions, so that a chip in the communications apparatus performs any data packet transmission method provided in the foregoing embodiments of this application.

Optionally, the computer instructions are stored in a storage unit.

Optionally, the storage unit is a storage unit, inside the chip, such as a register or a buffer. Alternatively, the storage unit may be a storage unit, that is inside a terminal and that is located outside the chip, such as a ROM, another type of static storage device that can store static information and instructions, or a RAM. Any processor mentioned above may be a CPU, a microprocessor, an ASIC, or one or more integrated circuits configured to control execution of a program for the foregoing data packet transmission method. The processing unit and the storage unit, may be decoupled, separately disposed on different physical devices, and connected in a wired or wireless manner to implement functions of the processing unit and the storage unit respectively, to support the system chip in implementing various functions in the foregoing embodiments. Alternatively, the processing unit and the memory may be coupled on a same device.

It may be understood that the memory in the embodiments of this application may be a volatile memory or a nonvolatile memory, or may include a volatile memory and a nonvolatile memory. The nonvolatile memory may be a ROM, a programmable read-only memory (PROM), an erasable programmable read-only memory (EPROM), an electrically erasable programmable read-only memory (EEPROM), or a flash memory. The volatile memory may be a RAM and is used as an external cache. There are a plurality of different types of RAMs, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct Rambus random access memory (DR RAM).

The terms "system" and "network" may be used interchangeably in this specification. The term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

The terms "uplink" and "downlink" in this application are used to describe a data/information transmission direction in a specific scenario. For example, an "uplink" direction is usually a direction in which data/information is transmitted from a terminal to a network side, or a direction in which data/information is transmitted from a distributed unit to a centralized unit; and a "downlink" direction is usually a direction in which data/information is transmitted from a network side to a terminal, or a direction in which data/information is transmitted from a centralized unit, to a distributed unit. It may be understood that "uplink" and "downlink" are merely used to describe a data/information transmission direction, without limiting a specific starting or ending device of data/information transmission.

In this application, names may be assigned to various objects such as messages, information, devices, network elements, systems, apparatuses, actions, operations, procedures, and concepts. It may be understood that the specific names do not constitute a limitation on the related objects. The assigned names may vary with factors such as scenarios, contexts, or usage habits. Understanding of technical meanings of technical terms in this application should be determined mainly based on functions and technical effects embodied or performed by the technical terms in the technical solutions.

In the embodiments of this application, if there is no particular description or logical collision, terms and/or descriptions in different embodiments are consistent and may be mutually referenced. Technical features in different embodiments may be combined based on an internal logical relationship to form a new embodiment.

All or some of the methods in the embodiments of this application may be implemented by software, hardware, firmware, or any combination thereof. When the software is used to implement the embodiments, the embodiments may be implemented all or partially in a form of a computer program product. The computer program product includes one or more computer programs or instructions. When the computer programs or the instructions are loaded and executed on a computer, the procedures or functions in the embodiments of this application are all or partially performed. The computer may be a general-purpose computer, a dedicated computer, a computer network, or another programmable apparatus. The computer programs or the instructions may be stored in a computer-readable storage medium, or may be transmitted by using a computer-readable storage medium. The computer-readable storage medium may be any usable medium accessible by a computer, or a data storage device, such as a server integrating one or more usable media.

It may be clearly understood by a person skilled in the art that, for the purpose of convenient, and brief description, for a specific working process of the foregoing described system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units; in other words, may be located in one place, or may be distributed on a plurality of network units. Some or all of the units may be selected based on an actual requirement to achieve the objectives of the solutions of the embodiments.

In addition, the functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a sewer, a network device, or the like) to perform all or some steps of the method in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving a first data packet, wherein the first data packet is disordered and within a reordering window; and
   delivering the first data packet during running of a reordering timer upon an arrival of a first delay cut-off moment corresponding to the first data packet or an arrival of a second delay cut-off moment of a second data packet in the reordering window, wherein the second data packet was received before the first data packet, and wherein the first delay cut-off moment and the second delay cut-off moment are determined based on a transmission delay budget.

2. The method according to claim 1, wherein the method further comprises:
   stopping the reordering timer, wherein the reordering timer is triggered to start by the first data packet or by the second data packet, and wherein the first delay cut-off moment or the second delay cut-off moment is earlier than a timeout moment of the reordering timer.

3. The method according to claim 1, wherein the second delay cut-off moment is corresponding to a first unreceived data packet counted forward from the first data packet in the reordering window.

4. The method according to claim 1, wherein the second data packet has an earliest delay cut-off moment among one or more data packets before the first data packet in the reordering window, and wherein delay cut-off moment associated with each of the one or more data packets does not time out.

5. The method according to claim 1, wherein the method further comprises:
   delivering a third data packet that has been stored in the reordering window and that is before the first data packet; and
   delivering a fourth data packet that has been stored in the reordering window, that is after the first data packet, and that has a sequence number consecutive to that of the first data packet.

6. The method according to claim 1, wherein the first data packet carries a sending moment of the first data packet, and wherein the method further comprises:
   determining the first delay cut-off moment based on the sending moment of the first data packet and the transmission delay budget.

7. An apparatus, comprising:
   at least one processor; and
   one or more memories storing instructions for execution by the at least one processor, wherein, when executed, the instructions cause the apparatus to perform operations comprising:
      receiving a first data packet, wherein the first data packet is disordered and within a reordering window; and
      delivering the first data packet during running of a reordering timer upon an arrival of a first delay cut-off moment corresponding to the first data packet or an arrival of a second delay cut-off moment of a second data packet in the reordering window, wherein the second data packet was received before the first data packet, and wherein the first delay cut-off moment and the second delay cut-off moment are determined based on a transmission delay budget.

8. The apparatus according to claim 7, the operations comprising:
   stopping the reordering timer, wherein the reordering timer is triggered to start by the first data packet or by the second data packet, and wherein the first delay cut-off moment or the second delay cut-off moment is earlier than a timeout moment of the reordering timer.

9. The apparatus according to claim 7, wherein the second delay cut-off moment is corresponding to a first unreceived data packet counted forward from the first data packet in the reordering window.

10. The apparatus according to claim 7, wherein the second data packet has an earliest delay cut-off moment among one or more data packets before the first data packet in the reordering window, and wherein delay cut-off moment associated with each of the one or more data packets does not time out.

11. The apparatus according to claim 7, the operations comprising:
    delivering a third data packet that has been stored in the reordering window and that is before the first data packet; and
    delivering a fourth data packet that has been stored in the reordering window, that is after the first data packet, and that has a sequence number consecutive to that of the first data packet.

12. The apparatus according to claim 7, wherein the first data packet carries a sending moment of the first data packet, and wherein the operations comprise:
    determining the first delay cut-off moment based on the sending moment of the first data packet and the transmission delay budget.

13. A non-transitory memory storage medium comprising computer-executable instructions that, when executed, cause a first radio access network node to perform operations comprising:
receiving a first data packet, wherein the first data packet is disordered and within a reordering window; and
delivering the first data packet during running of a reordering timer upon an arrival of a first delay cut-off moment corresponding to the first data packet or an arrival of a second delay cut-off moment of a second data packet in the reordering window, wherein the second data packet was received before the first data packet, and wherein the first delay cut-off moment and the second delay cut-off moment are determined based on a transmission delay budget.

14. The non-transitory memory storage medium according to claim 13, the operations comprising:
stopping the reordering timer, wherein the reordering timer is triggered to start by the first data packet or by the second data packet, and wherein the first delay cut-off moment or the second delay cut-off moment is earlier than a timeout moment of the reordering timer.

15. The non-transitory memory storage medium according to claim 13, wherein the second delay cut-off moment is corresponding to a first unreceived data packet counted forward from the first data packet in the reordering window.

16. The non-transitory memory storage medium according to claim 13, wherein the second data packet has an earliest delay cut-off moment among one or more data packets before the first data packet in the reordering window, and wherein delay cut-off moment associated with each of the one or more data packets does not time out.

17. The non-transitory memory storage medium according to claim 13, the operations comprising:
delivering a third data packet that has been stored in the reordering window and that is before the first data packet; and
delivering a fourth data packet that has been stored in the reordering window, that is after the first data packet, and that has a sequence number consecutive to that of the first data packet.

18. The non-transitory memory storage medium according to claim 13, wherein the first data packet carries a sending moment of the first data packet, and wherein the operations comprise:
determining the first delay cut-off moment based on the sending moment of the first data packet and the transmission delay budget.

* * * * *